United States Patent
Park et al.

(10) Patent No.: US 10,942,993 B2
(45) Date of Patent: *Mar. 9, 2021

(54) USER TERMINAL APPARATUS HAVING A PLURALITY OF USER MODES AND CONTROL METHOD THEREOF

(71) Applicant: SAMSUNG ELECTRONICS CO., LTD., Suwon-si (KR)

(72) Inventors: Sun-hwa Park, Seoul (KR); Youn-gun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,932

(22) Filed: Jul. 25, 2013

(65) Prior Publication Data

US 2014/0033298 A1 Jan. 30, 2014

(30) Foreign Application Priority Data

Jul. 25, 2012 (KR) .................. 10-2012-0080999

(51) Int. Cl.
| | | |
|---|---|---|
| H04L 29/06 | (2006.01) | |
| G06F 21/31 | (2013.01) | |
| G06F 21/32 | (2013.01) | |
| G06F 21/74 | (2013.01) | |
| G06F 21/36 | (2013.01) | |
| G06F 21/62 | (2013.01) | |

(52) U.S. Cl.
CPC ............. *G06F 21/31* (2013.01); *G06F 21/32* (2013.01); *G06F 21/36* (2013.01); *G06F 21/629* (2013.01); *G06F 21/74* (2013.01)

(58) Field of Classification Search
CPC .......... G06F 21/31; G06F 21/36; G06F 21/74; G06F 21/32

See application file for complete search history.

(56) References Cited

U.S. PATENT DOCUMENTS

| | | | |
|---|---|---|---|
| 7,593,000 B1 | 9/2009 | Chin | |
| 7,831,047 B2 * | 11/2010 | Rowe | ............................ 380/251 |
| 8,161,290 B2 | 4/2012 | McQuaide, Jr. | |
| 8,463,253 B2 * | 6/2013 | Chipalkatti | ....... H04M 1/72572 |
| | | | 455/406 |

(Continued)

FOREIGN PATENT DOCUMENTS

| | | |
|---|---|---|
| CN | 102236527 A | 11/2011 |
| CN | 102449916 A | 5/2012 |

(Continued)

OTHER PUBLICATIONS

Communication dated Sep. 24, 2014, issued by the European Patent Office in counterpart European Application No. 13178085.0.

(Continued)

*Primary Examiner* — Wasika Nipa
(74) *Attorney, Agent, or Firm* — Sughrue Mion, PLLC

(57) ABSTRACT

A user terminal apparatus and a control method thereof are provided. The control method includes: receiving a user control input selecting a user mode; reconstituting a screen based on use authority information of a user mode selected according to the user control input; and displaying the reconstituted screen.

27 Claims, 14 Drawing Sheets

(56) References Cited

U.S. PATENT DOCUMENTS

| | | | | |
|---|---|---|---|---|
| 8,504,842 | B1* | 8/2013 | Meacham | G06F 21/36 |
| | | | | 713/182 |
| 8,850,340 | B2 | 9/2014 | Lee et al. | |
| 8,868,901 | B2* | 10/2014 | Kim | H04M 1/72563 |
| | | | | 713/1 |
| 8,893,055 | B2* | 11/2014 | Chae | G06F 3/04817 |
| | | | | 715/811 |
| 8,904,164 | B2* | 12/2014 | Ferren | G02B 13/0065 |
| | | | | 455/414.1 |
| 8,904,479 | B1* | 12/2014 | Johansson | G06F 21/36 |
| | | | | 382/181 |
| 9,171,139 | B2* | 10/2015 | Newell | G06F 21/31 |
| 9,710,139 | B2* | 7/2017 | Yoo | G06F 3/0488 |
| 2004/0259633 | A1* | 12/2004 | Gentles et al. | 463/29 |
| 2005/0107114 | A1* | 5/2005 | Ocock | H04W 8/183 |
| | | | | 455/550.1 |
| 2008/0020803 | A1* | 1/2008 | Rios | H04M 1/667 |
| | | | | 455/565 |
| 2008/0034217 | A1* | 2/2008 | McQuaide | H04B 1/202 |
| | | | | 713/186 |
| 2010/0011299 | A1 | 1/2010 | Brodersen et al. | |
| 2010/0058211 | A1 | 3/2010 | Lee et al. | |
| 2010/0306718 | A1* | 12/2010 | Shim | G06F 3/04883 |
| | | | | 715/863 |
| 2010/0325710 | A1* | 12/2010 | Etchegoyen | 726/7 |
| 2011/0028186 | A1* | 2/2011 | Lee | G06F 3/0486 |
| | | | | 455/566 |
| 2011/0041102 | A1 | 2/2011 | Kim | |
| 2011/0173091 | A1 | 7/2011 | EWald | |
| 2011/0283241 | A1 | 11/2011 | Miller et al. | |
| 2011/0289423 | A1 | 11/2011 | Kim et al. | |
| 2011/0300831 | A1* | 12/2011 | Chin | G06F 1/3203 |
| | | | | 455/411 |
| 2012/0046077 | A1* | 2/2012 | Kim | H04M 1/72577 |
| | | | | 455/566 |
| 2012/0084734 | A1 | 4/2012 | Wilairat | |
| 2012/0129495 | A1 | 5/2012 | Chae et al. | |
| 2012/0154413 | A1* | 6/2012 | Kim | H04M 1/72563 |
| | | | | 345/530 |
| 2013/0036377 | A1* | 2/2013 | Colley | G06F 3/0488 |
| | | | | 715/764 |
| 2013/0275376 | A1* | 10/2013 | Hudlow et al. | 707/639 |

FOREIGN PATENT DOCUMENTS

| | | |
|---|---|---|
| EP | 2390812 A1 | 11/2011 |
| EP | 2469813 A1 | 6/2012 |
| GB | 2486707 A | 6/2012 |
| JP | 2012-133787 A | 7/2012 |
| KR | 100434061 B1 | 6/2004 |
| KR | 10-2005-0017036 A | 2/2005 |
| KR | 10-2011-0128567 A | 11/2011 |
| KR | 10-2012-0066894 A | 6/2012 |
| KR | 10-2012-0070472 A | 6/2012 |
| RU | 2420028 C2 | 5/2011 |
| WO | 2010/137859 A2 | 12/2010 |
| WO | 2012/047412 A1 | 4/2012 |

OTHER PUBLICATIONS

Communication dated Dec. 5, 2017, by the State Intellectual Property Office of the People's Republic of China in counterpart Chinese Patent Application No. 201380039389.4.
Communication dated May 17, 2017 issued by the State Intellectual Property Office of P.R. China in counterpart Chinese Patent Application No. 201380039389.4.
Communication dated Jul. 18, 2017 issued by the Russian Federal Service for Intellectual Property in counterpart Russian Patent Application No. 2015106141.
Communication dated Jul. 2, 2018 issued by the Russian Federal Service for Intellectual Property in counterpart Russian Application No. 2015106141/08.
Communication dated Jun. 4, 2018 issued by the State Intellectual Property Office of P.R. China in counterpart Chinese Application No. 201380039389.4.
Communication dated Jul. 18, 2018, issued by the European Patent Office in counterpart European Application No. 13178085.0.
Communication dated Oct. 9, 2016 issued by the State Intellectual Property Office of P.R. China in counterpart Chinese Patent Application No. 201380039389.4.
Communication dated Nov. 9, 2018, issued by t the Korean Intellectual Property Office in counterpart Korean Patent Application No. 10-2012-0080999.
Communication dated May 27, 2019, issued by the Korean Intellectual Property Office in counterpart Korean Application No. 10-2012-0080999.
Communication dated Jan. 10, 2020 issued by the Brazilian Patent Office in counterpart Application No. BR112015001530-1.
Communication dated Jan. 23, 2020 issued by the Korean Intellectual Property Office in counterpart Korean Application No. 10-2012-0080999.
Communication dated Nov. 28, 2019, issued by the Korean Intellectual Property Office in counterpart Korean Application No. 10-2012-0080999.
Communication dated Feb. 26, 2020, issued by the Indian Patent Office in counterpart Indian Application No. 1207/DELNP/2015.
Communication dated Mar. 3, 2020, issued by the European Patent Office in counterpart European Application No. 13 178 085.0.
Communication dated May 14, 2020 issued by the Korean Intellectual Property Office in counterpart Korean Application No. 10-2020-0022955.
International Search Report for PCT/KR2013/006693 dated Nov. 25, 2013 [PCT/ISA/210].
Written Opinion for PCT/KR2013/006693 dated Nov. 25, 2013 [PCT/ISA/237].
Communication dated Nov. 26, 2020, issued by the Korean Intellectual Property Office in Korean Application No. 10-2020-0022955.

* cited by examiner

USER TERMINAL APPARATUS HAVING A PLURALITY OF USER MODES AND CONTROL METHOD THEREOF

CROSS-REFERENCE TO RELATED APPLICATION

This application claims priority from Korean Patent Application No. 10-2012-0080999, filed on Jul. 25, 2012, in the Korean Intellectual Property Office, the disclosure of which is incorporated herein by reference in its entirety.

BACKGROUND

1. Field

Apparatuses and methods consistent with exemplary embodiments relate to providing a user terminal apparatus and a control method thereof, and more particularly, to providing a user terminal apparatus which reconstitutes and displays a screen based on user authority information corresponding to a selected user mode, and a control method thereof.

2. Description of the Related Art

The development of electronic technologies has led to the development of user terminal apparatuses, such as high-tech smart phones based on information technologies.

Demands for high-tech user terminal apparatuses have increased due to price reductions and performance improvements. Therefore, efforts to develop various convenient methods for using high-tech user terminal apparatuses have accelerated.

As a result, various methods related to locking and unlocking the screen of a user terminal apparatus for protecting privacies of users have been developed.

However, in the related art, unlocking methods do not map a particular function to a control of unlocking the user terminal apparatus. Only a function for simply unlocking and using the user terminal apparatus is provided.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a user terminal apparatus which reconstitutes and displays a screen according to user authority information of a user mode selected according to a user control input, and a control method thereof.

According to an aspect of an exemplary embodiment, there is provided a method of controlling a user terminal apparatus. The method may include: receiving a user control input selecting a user mode; reconstituting a screen based on use authority information of a user mode selected according to the user control input; and displaying the reconstituted screen.

The user mode may include a host mode in which a use authority to all functions provided in the user terminal apparatus is given and a guest mode in which a limited use authority to functions provided in the user terminal apparatus is given.

The user control input may be an unlocking control input for unlocking the user terminal apparatus, and the unlocking of the user terminal apparatus may be performed through an unlocking pattern recognition, an unlocking password recognition, an unlocking voice recognition, an unlocking face recognition, or an unlocking iris recognition.

The use authority information may include at least one of home background screen information, item use authority information, item information to be executed, and communication service use authority information.

If the use authority information includes the home background screen information, the controller may reconstitute the screen so that the screen has a home background screen corresponding to the home background screen information, by using the home background information corresponding to the user mode.

An item may include an application and a folder including at least one application, and the item use authority information may include application execution authority information, execution authority information with respect to a function provided in the application, and folder execution authority information.

If the use authority information includes the item use authority information, the reconstituting of the screen may include: generating at least one page screen including only executable items by using the item use authority information corresponding to a user mode; and reconstituting each page of the screen according the generated at least one page screen.

If the use authority information includes the item use authority information, the reconstituting of the screen may include: generating at least one first page screen including only executable items and at least one second page screen including only un-executable items by using the item use authority information corresponding to the user mode; and reconstituting each page of the screen according to the generated first and second page screens.

If the use authority information includes the item use authority information, the reconstituting of the screen may include: generating at least one page screen comprising executable items and un-executable items by using the item use authority information corresponding to the user mode; and reconstituting each page of the screen according to the generated at least one page screen.

An identifier indicating lack of authority may be displayed on the second page screen.

An identifier indicating lack of authority may be displayed on the un-executable item.

If the identifier indicating the lack of authority is selected, the method may further include: displaying a screen for inputting a user control input for selecting the user mode on a whole portion or a divided portion of the screen.

If the use authority information includes the item information to be executed, the screen may be reconstituted to have an execution screen corresponding to the item information to be executed, by using the item information corresponding to the user mode.

The screen may be reconstituted to include an identifier displaying the user mode selected according to the user control input on the screen.

If the identifier displaying the selected user mode is selected, the method may further include: displaying a screen for inputting a user control input for selecting the user mode on a whole portion or a divided portion of the screen.

The method may further include: displaying a screen for inputting a user control input corresponding to the guest mode and the host mode.

The method may further include: displaying a screen for inputting the use authority information corresponding to the user mode.

According to an aspect of another exemplary embodiment, there is provided a user terminal apparatus including: a display unit configured to display a screen; an input unit configured to receive a user control input selecting a user mode; a storage unit configured to store use authority information corresponding to the user mode; and a controller configured to reconstitute the screen based on use authority information corresponding to a user mode selected according to the user control input and control the display unit to display the reconstituted screen.

The user mode may include a host mode in which a use authority to all functions provided in the user terminal apparatus is given and a guest mode in which a limited use authority to functions provided in the user terminal apparatus is given.

The user control input may be an unlocking control input for unlocking the user terminal apparatus, and the unlocking of the user terminal apparatus may be performed through an unlocking pattern recognition, an unlocking password recognition, an unlocking voice recognition, an unlocking face recognition, or an unlocking iris recognition.

The use authority information may include at least one of home background screen information, item use authority information, item information to be executed, and communication service use authority information.

If the use authority information includes the home background screen information, the controller may reconstitute the screen so that the screen has a home background screen corresponding to the home background screen information, by using the home background information corresponding to the user mode.

An item may include an application and a folder including at least one application, and the item use authority information may include application execution authority information, execution authority information with respect to a function provided in the application, and folder execution authority information.

If the use authority information includes the item use authority information, the controller may generate at least one page screen including only executable items by using the item use authority information corresponding to a user mode and reconstitute each page of the screen according to the generated at least one page screen.

If the use authority information includes the item use authority information, the controller may generate at least one first page screen including only executable items and at least one second page screen including only un-executable items by using the item use authority information corresponding to the user mode and reconstitute each page of the screen according to the generated first and second page screens.

If the use authority information comprises the item use authority information, the controller may generate at least one page screen including executable items and un-executable items by using the item use authority information corresponding to the user mode and reconstitute each page of the screen according to the generated at least one page screen.

An identifier indicating lack of authority may be displayed on the second page screen.

An identifier indicating lack of authority may be displayed on the un-executable item.

If the identifier indicating the lack of authority is selected, the controller may control the display unit to display a screen for inputting a user control input for selecting the user mode on a whole portion or a divided portion of the screen.

If the use authority information includes the item information to be executed, the controller may reconstitute the screen so that the screen has an execution screen corresponding to the item information to be executed, by using the item information corresponding to the user mode.

The controller may reconstitute the screen to include an identifier displaying the user mode selected according to the user control input on the screen.

If the identifier displaying the selected user mode is selected, the controller may control the display unit to display a screen for inputting a user control input for selecting the user mode on a whole portion or a divided portion of the screen.

The display unit may display a screen for inputting a user control input corresponding to the guest mode and the host mode.

The display unit may display a screen for inputting the use authority information corresponding to the user mode.

According to an aspect of another exemplary embodiment, there is provided a non-transitory computer readable recording medium having recorded thereon a program code for performing the method.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
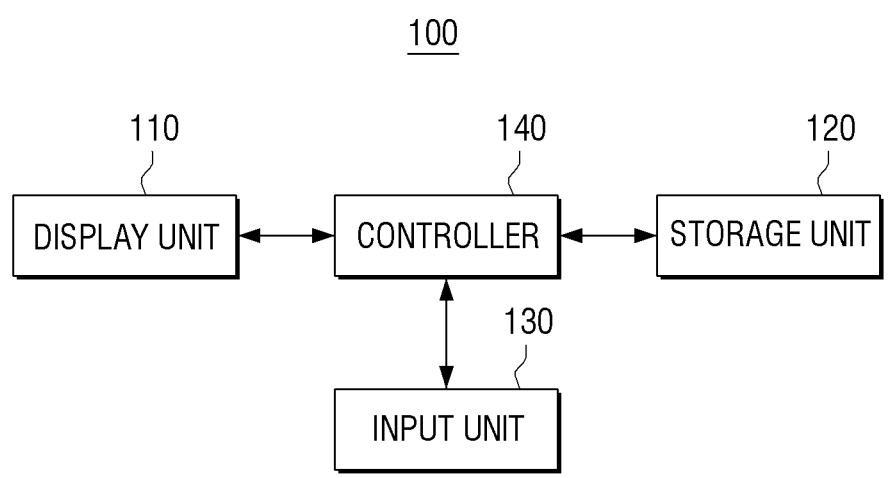
FIG. 1 is a block diagram illustrating a user terminal apparatus according to an exemplary embodiment.

Exemplary embodiments are described in greater detail with reference to the accompanying drawings.

In the following description, the same drawing reference numerals are used for the same elements in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a user terminal apparatus 100 according to an exemplary embodiment. Referring to FIG. 1, the user terminal apparatus 100 includes a display unit 110, a storage unit 120, an input unit 130, and a controller 140.

Here, the user terminal apparatus 100 may be realized as various types of apparatuses, such as a portable phone, a smart phone, a tablet computer, a notebook computer, a digital broadcasting terminal, a personal digital assistant (PDA), a portable multimedia player (PMP), a navigation system, a digital television (TV), a desktop computer, etc.

The display unit 110 displays a screen. In particular, the display unit 110 may display a screen for selecting a user mode. Here, the user mode may include a host mode and a guest mode.

The host mode may be a mode in which use authority is given with respect to all functions provided in the user terminal apparatus 100. In other words, the host mode may be a mode used by a host of the user terminal apparatus 100. The guest mode may be a mode in which limited use authority is given with respect to functions provided in the user terminal apparatus 100. In other words, the guest mode may be a mode used by a user of the user terminal apparatus 100 who is not the host of the user terminal apparatus 100.

For example, the host mode may be a mode in which use authority is given with respect to all items, and the guest mode may be a mode in which use authority is given with respect to limited items.

Here, an item may include an application or a folder including at least one application.

Also, use authority to an item may include an execution authority to an application, an execution authority to a function provided in the application, and an execution authority to the folder. Therefore, the host mode may refer to a mode that has execution authority to all applications, execution authority to all functions provided in the applications, and execution authority to all folders. Accordingly, the guest mode may refer to a mode that has limited execution authority to an application, limited execution authority to a function provided in the application, and limited execution authority to a folder.

For convenience of description, a camera application will be used as an example. In this case, execution authority to a camera application may refer to authority to execute the camera application, and a particular function execution authority to the camera application may refer to authority to execute an album function and a photographing function provided in the camera application. Therefore, as explained above, the host mode may execute the camera application, and the album function and the photographing function provided in the camera application. However, if use authority to an application is limited in the host mode, limited applications and limited functions of an application may not be executed.

Depending on the settings, the guest mode may not execute the camera application. If however, the settings allow execution of the camera application in guest mode, at least one of the album function and the photographing function provided in the camera application may not be executed. However, if the settings allow the guest mode to execute the camera application and all functions provided in the camera application, the camera application and the all functions provided in the camera application may be executed even in the guest mode.

In other words, item use authorities of the host mode and the guest mode may vary according to settings of the user terminal apparatus 100. For example, in a guest mode, the use of all applications except for applications designated by a user may be prohibited.

The screen for selecting the user mode may be a locking screen that displays a locked state of the user terminal apparatus 100. The locking screen may be realized as various types of screens displaying that the user terminal apparatus 100 is currently locked, such as an unlocking pattern recognition screen, an unlocking password recognition screen, an unlocking voice recognition screen, an unlocking face recognition screen, a unlock iris recognition screen, etc. Therefore, the user mode may be selected by performing an unlocking control input for unlocking the user terminal apparatus 100. Here, unlocking may be performed through an unlocking pattern recognition, an unlocking password recognition, an unlocking voice recognition, an unlocking face recognition, or an unlocking iris recognition. This will now be described in more detail with reference to FIGS. 2A through 2E.

Figure 2A:
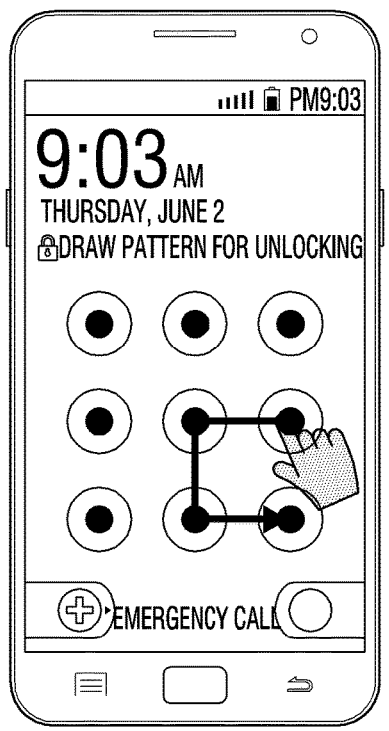
FIGS. 2A through 2E are views illustrating an unlocking control input according to an exemplary embodiment.
Figure 2B:
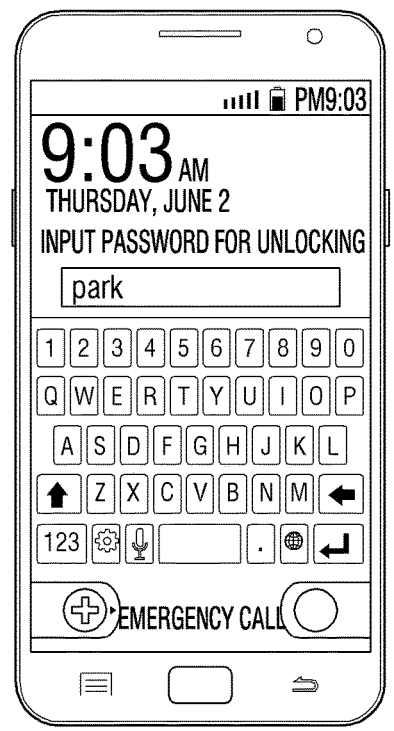
Figure 2C:
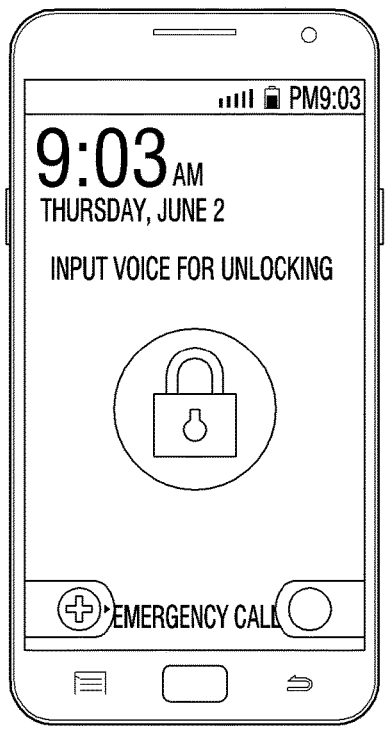
Figure 2D:
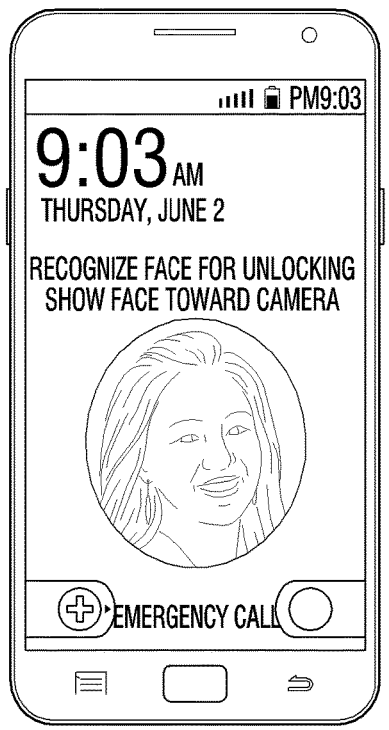
Figure 2E:
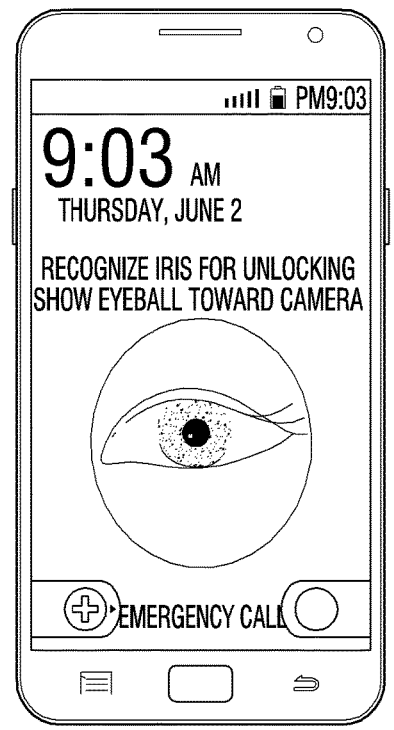

FIGS. 2A through 2E are views illustrating a screen for selecting a user mode according to an exemplary embodiment. As shown in FIG. 2A, the screen for selecting the user screen may be an unlocking pattern recognition screen. The screen for selecting the user mode may be an unlocking password recognition screen as shown in FIG. 2B. The screen for selecting the user mode may be an unlocking voice recognition screen as shown in FIG. 2C. The screen for selecting the user mode may be an unlocking face recognition screen as shown in FIG. 2D. The screen for selecting the user mode may be an unlocking iris recognition screen as shown in FIG. 2E.

In this case, if an unlocking control input for unlocking the user terminal apparatus 100 is performed, the controller 140 may set the user terminal apparatus 100 to a user mode corresponding to the performed unlocking control input.

If the user terminal apparatus 100 is unlocked by the unlocking control input, and the user mode is selected, the display unit 110 may display a screen corresponding to the selected user mode.

The display unit 110 may display a screen for inputting a user control input corresponding to the user mode. In other words, since a host mode and a guest mode are selected by the user control input for unlocking the user terminal apparatus 100, the display unit 110 may display a screen for inputting/performing an unlocking control input corresponding to the host mode and the guest mode.

For example, if the user control input is an unlocking control input performed through an unlocking pattern, the display unit 110 may display a screen for inputting an unlocking pattern corresponding to the host mode. The display unit 110 may also display a screen for inputting an unlocking pattern corresponding to the guest mode. Even if the user control input is an unlocking control input performed through an unlocking password input, an unlocking control input performed through an unlocking voice input, an unlocking control input performed through an unlocking face information input, or an unlocking control input performed through an unlocking iris information input, the display unit 110 may display a screen for inputting an unlocking control input corresponding to each mode. Therefore, a host may set a user control input corresponding to a user mode through the input unit 130. However, a screen for inputting/performing the user control input corresponding to the user mode may be provided only in the host mode to protect privacy and usability of the host. This will be described in more detail with reference to FIGS. 9A and 9B.

Figure 9A:
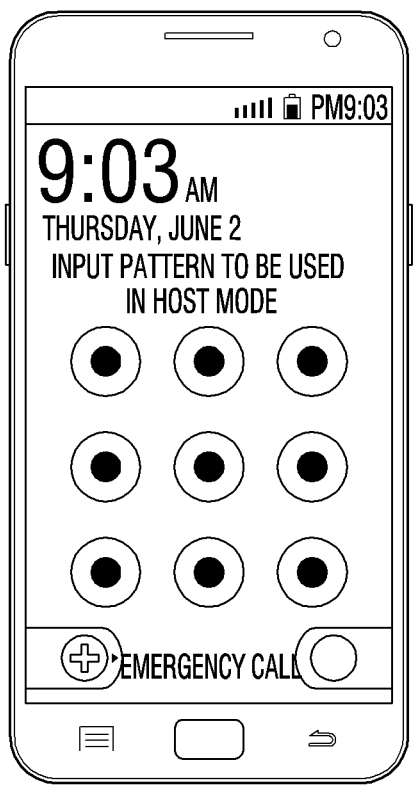
FIGS. 9A and 9B are views illustrating a screen for inputting a user control input corresponding to a host mode or a guest mode according to an exemplary embodiment.
Figure 9B:
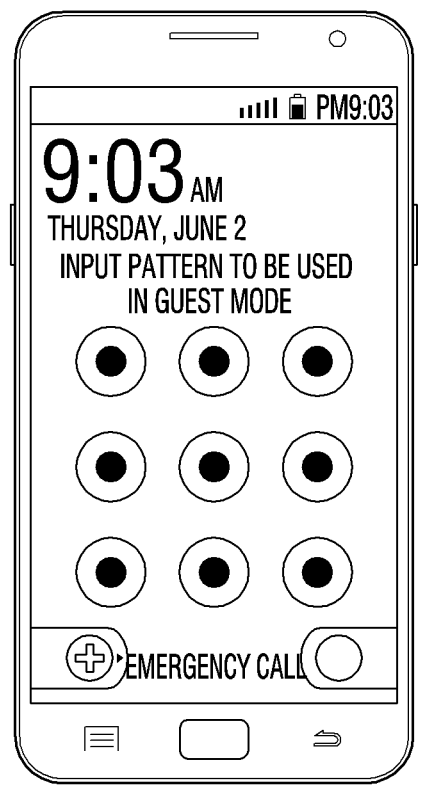

FIGS. 9A and 9B are views illustrating a screen for inputting a user control input corresponding to a host mode or a guest mode. For example, if the user control input is an unlocking control input performed through an unlocking pattern, a screen for inputting an unlocking pattern corresponding to the host mode may be displayed as shown in FIG. 9A. Also, as shown in FIG. 9B, a screen for inputting an unlocking pattern corresponding to the guest mode may be displayed.

The display unit 110 may also display a screen for inputting use authority information corresponding to the user mode. Here, the use authority information may be use authority information about all functions provided in the user terminal apparatus 100. For example, the use authority information may include at least one of item use authority information, item information to be executed, and communication service use authority information. In this case, the display unit 110 may display a screen for inputting at least one of home background screen information corresponding to the host mode or the guest mode, item use authority information, item information to be executed, and communication service use authority information. The host may set use authority information corresponding to the user mode through the input unit 130. Here, the screen for inputting the use authority information may be provided if a system environment setting application is executed. In other words, if the system environment setting application is executed, the display unit 110 may display a screen for inputting at least one of home background screen information corresponding to the host mode or the guest mode, item use authority information, item information to be executed, and communication service use authority information. For example, if the system environment setting application is executed, the display unit 110 may display a screen for inputting the home background screen information corresponding to the host mode and the guest mode. Also, if the system environment setting application is executed, the display unit 110 may display a screen for setting an application as executable in the host mode and the guest mode, a screen for setting a function provided in a particular application as executable in the host mode and the guest mode, and a screen for setting a folder as executable in the host mode and the guest mode. If the system environment setting application is executed, the display unit 110 may display a screen for setting an item to be immediately execute in the host mode and the guest mode. If the system environment setting application is executed, the display unit 110 may display a screen for setting communication services as useable and a usable data communication capacity in the host mode and the guest mode.

In particular, in relation to the executable function provided in a particular application, if the system environment setting application is executed, functions of past albums, past messages, Social Networking Service (SNS) automatic connections, a mass of transmissions, long-time calls, download services, etc., which are related to privacy of the host and provided in the particular application, may be set not to be executable in the guest mode.

The screen for inputting the use authority information may be provided with respect to each item when an environment setting function of each item is selected. This will now be described in more detail with reference to FIG. 10.

Figure 10:
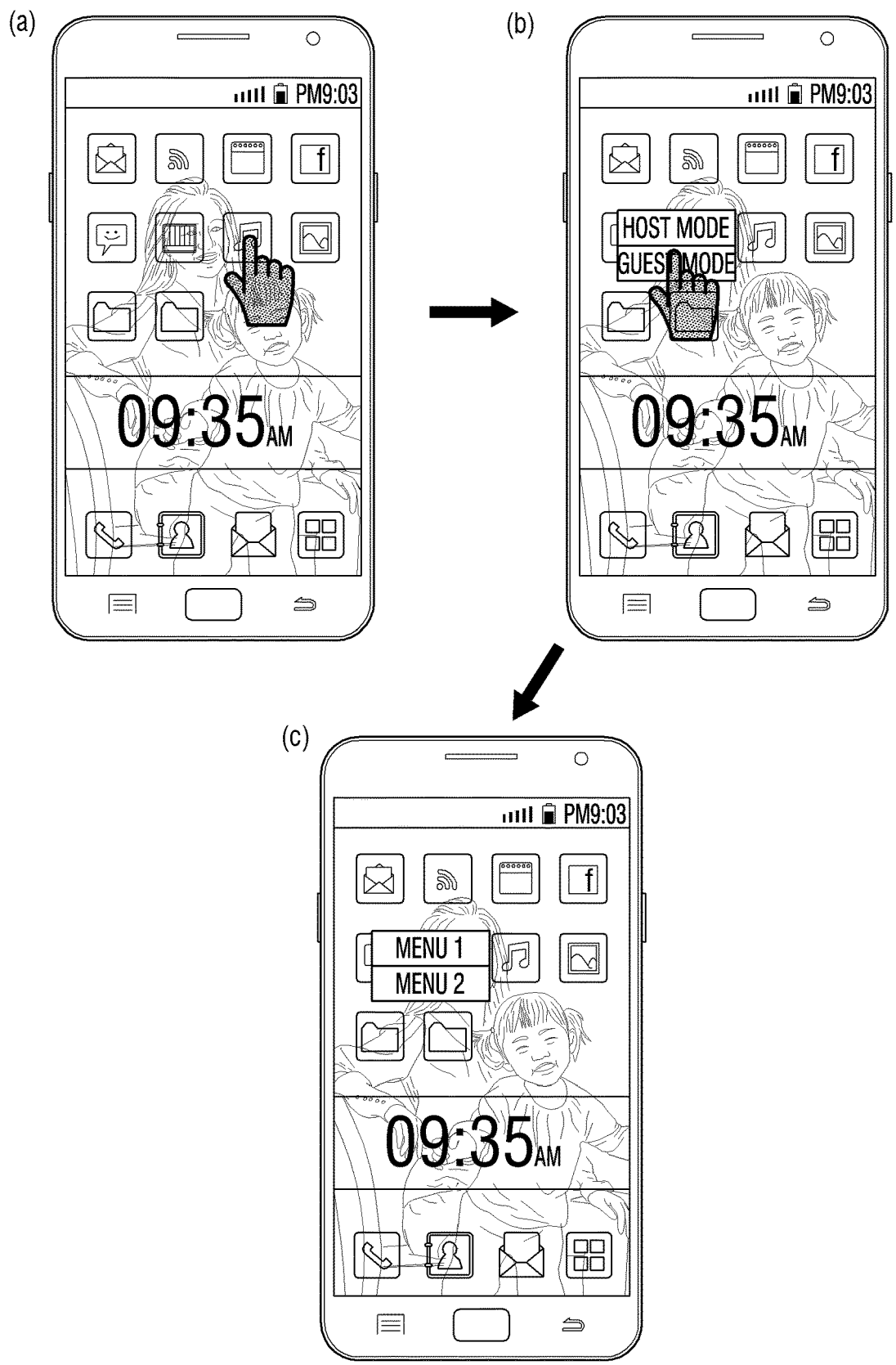
FIG. 10 is views illustrating a screen for inputting user authority information corresponding to a user mode according to an exemplary embodiment.

FIG. 10 is views illustrating a screen for inputting use authority information corresponding to a user mode according to an exemplary embodiment. If an environment setting function is selected through a particular input (for example, touch & hold) for an item as shown in view (a) of FIG. 10, a screen for setting a host mode or a guest mode may be displayed as shown in view (b) of FIG. 10. If a user selects the host mode, a selected application may be provided only in the host mode. If the user selects the guest mode, a screen for setting execution authority information (menu 1) with respect to an application and particular function execution authority information (menu 2) provided in the application may be displayed as shown in view (c) of FIG. 10. If an execution authority to an application is set in the guest mode, a selected application may be provided in the host mode and the guest mode. If a particular function execution authority provided in the application is set in the guest mode, a selected application may be provided in the guest mode, but a selected particular function of the selected application may be limited in the guest mode. However, all functions of the application may be provided in the host mode.

The screen for inputting the use authority information corresponding to the user mode may be provided only in the host mode to protect privacy and usability of the host.

Here, the display unit 110 may be realized as at least one of a liquid crystal display (LCD), a thin film transistor liquid crystal display (TFT LCD), an organic light-emitting diode (OLED), a flexible display, a 3-dimensional (3D) display, and a transparent display.

The storage unit 120 stores various types of data and programs necessary for driving the user terminal apparatus 100.

In particular, the storage unit 120 may store a user mode corresponding to an unlocking control input. In other words, the storage unit 120 may store user modes respectively corresponding to an unlocking pattern, an unlocking password, an unlocking voice, unlocking face information, and unlocking iris information.

For example, the storage unit 120 may map a first unlocking pattern with the host mode and then store the mapped first unlocking pattern. The storage unit 120 may also map a second unlocking pattern with the guest mode and then store the mapped second unlocking pattern. A plurality of first unlocking patterns and a plurality of second unlocking patterns may be provided. Therefore, if the first unlocking pattern is input/performed, the controller 140 may set the user terminal apparatus 100 to the host mode. If the second unlocking pattern is performed, the controller 140 may set the user terminal apparatus 100 to the guest mode. As described above, the storage unit 120 may also map an unlocking password, an unlocking voice, an unlocking face information, and an unlocking iris information with the host mode or the guest mode and then store the mapped unlocking password, unlocking voice, unlocking face information, and unlocking iris information.

The storage unit 120 may also store use authority information corresponding to a user mode. In other words, the storage unit 120 may map at least one of home background screen information corresponding to the host mode and the guest mode, item use authority information, executed item information, and communication service use authority information with the host mode and the guest mode and then store the mapped information. Therefore, if a selected user mode is the host mode, the controller 140, that will be described later, may detect at least one of home background screen information corresponding to the host mode, item use authority information, item information to be executed, and communication service use authority information to reconstitute a screen. If the selected user mode is the guest mode, the controller 140 may detect at least one of home background screen information corresponding to the guest mode, item use authority information, item information to be executed, and communication service use authority information to reconstitute a screen.

The storage unit 120 may be realized as an internal storage device, such as a random access memory (RAM), a flash memory, a read only memory (ROM), an erasable programmable ROM (EPROM), an electronically erasable and programmable ROM (EEPROM), a register, a hard disc, a removable disc, a memory card, or the like, or a removable storage device, such as a universal serial bus (USB) memory, a CD-ROM, or the like.

The input unit 130 receives a user control input with respect to the user terminal apparatus 100. In particular, the input unit 130 may receive a user control input for selecting a user mode. Here, the user mode is selected through an unlocking control input for releasing an unlocked state. Therefore, the input unit 130 may receive an unlocking control input for unlocking the user terminal apparatus 100.

The input unit 130 may be realized as a touch sensor. The touch sensor may be realized as a capacitive type or a decompressing type touch sensor. The capacitive type touch sensor refers to a method of sensing micro-electricity excited into the body of a user when a part of the body of the user touches a surface of the display unit 110, by using a dielectric coated on the surface of the display unit 110 to calculate a touch coordinate. The decompressing type touch sensor refers to a method of sensing a current flowing due to a contact between upper and lower electrode plates of a touched point when a user touches a screen including the upper and lower electrode plates, to calculate a touch coordinate. Therefore, if a touch control input of the user is input, the input unit 130 may transmit an electrical signal corresponding to a touched point to the controller 140, and the controller 140 may recognize the touched point by using a coordinate, corresponding to which the electrical signal is transmitted. Therefore, the input unit 130 may receive an unlocking pattern or an unlocking password for unlocking performed by touching the input unit 130, and the controller 140 may detect a user mode corresponding to the received unlocking control input.

The input unit 130 may be realized as a proximity sensor. The proximity sensor senses a motion that approaches the surface of the display unit 110 without directly contacting the surface of the display unit 110. The proximity sensor may be realized in various forms, such as a high-frequency oscillation-type proximity sensor that forms a high frequency magnetic field to sense a current induced by a magnetic field characteristic varying with an approach of an object, a magnetic proximity sensor that uses a magnet, a capacitive proximity sensor that senses a capacitance varying due to the approach of the object, etc. Therefore, if a user control input performed by an approaching motion is sensed, the input unit 130 may transmit an electrical signal corresponding to the user control input to the controller 140, and the controller 140 may recognize the user control input performed by the approaching motion by using the electrical signal. As a result, the input unit 130 may receive an unlocking pattern or an unlocking password for unlocking performed according to the approaching motion, and the controller 140 may detect a user mode corresponding to the unlocking control input.

The input unit 130 may also be realized as a microphone. The microphone receives a voice uttered by the user. The microphone converts an input voice signal into an electrical signal and transmits the electrical signal to the controller 140. In this case, the controller 140 may determine whether the received voice is a voice of a host of the user terminal apparatus 100 or a voice of a person other than the host, by using the electrical signal.

For example, if an unlocking control input of the user is an utterance "unlocking", the controller 140 may detect a start and an end of the voice uttered by the user within the utterance "unlocking" input through the input unit 130 to determine a voice section. The controller 140 may calculate energy of the input voice signal, classify energy levels of the voice signal according to the calculated energy, and detect a voice section through dynamic programming. The controller 140 may compare a level of the detected voice section with a voice level of the host stored in the storage unit 120 to determine whether the received voice is a voice of the host of the user terminal apparatus 100 or a voice of a person other than the host. Therefore, the input unit 130 may receive an unlocking control input performed according to a voice input, and the controller 140 may detect a user mode corresponding to the input unlocking control input.

The input unit 130 may be realized as a camera. The camera captures a subject and transmits a captured image to the controller 140. If the user control input is an unlocking control input performed through an unlocking face recognition, the controller 140 may detect a face candidate area image by using a biology-based selective surrounding concentration model. In other words, the controller 140 may generate a saliency map of the captured image and detect a face candidate area image by using the generated saliency map. Here, the biology-based selective surrounding concentration model corresponds to modeling of a pinniped structure of a human and is divided into a data-driven processing process, that immediately reacts to an input image, and a conceptually driven processing process that uses learned information. The data-driven processing process and the conceptually driven processing process are widely well-known, and thus their detailed descriptions will be omitted. The controller 140 may apply a viola-jones method, a haar-feature method, or an adaboost algorithm to the detected face candidate area image to detect a face area image. The viola-jones method, the haar-feature method, and the adaboost algorithm are widely well-known, and thus their detailed descriptions will be omitted. The controller 140 may also compare the detected face area image with a face area image of the host, stored in the storage unit 120, to determine whether the detected face area image is a face of the host of the user terminal apparatus 100 or a face of a user other than the host. Therefore, the input unit 130 may receive an unlocking control input performed according to a face information input, and the controller 140 may detect a user mode corresponding to the input unlocking control input.

If the user control input is an unlocking control input performed through an unlocking iris recognition, the controller 140 may detect an eyeball area image from the captured image. The controller 140 may process the detected eyeball area image to detect an iris area image. In this case, the controller 140 may compare the detected iris area image with an iris area image of the host, stored in the storage unit 120, to determine whether the detected iris area image is an iris of the host of the user terminal apparatus 100 or an iris of a user other than the host. Therefore, the input unit 130 may receive an unlocking control input performed through an iris recognition, and the controller 140 may detect a user mode corresponding to the input unlocking control input.

The input unit 130 may be realized by combining an input apparatus, such as a mouse, a keyboard, or the like, with a display apparatus such as the display unit 110. In this case, the controller 140 may perform a function corresponding to a user control input through the input apparatus by using the user control input.

The controller 140 controls an overall operation of the user terminal apparatus 100. In detail, the controller 140 may control the display unit 110, the storage unit 120, and the whole or a part of the input unit 130.

In particular, the controller 140 may reconstitute a screen according to use authority information corresponding to a user mode selected according to the user control input. The controller 140 may detect the user mode corresponding to the user control input using the storage 120. The controller 140 may detect use authority information corresponding to the detected user mode using the storage unit 120 to reconstitute a screen. The controller 140 may also control the display unit 110 to display the reconstituted screen.

Here, the use authority information may be use authority information about all functions provided in the user terminal apparatus 100. For example, the use authority information may include at least one of home background screen information, item use authority information, item information to be executed, and communication service use authority information. An item may be an application or a folder including at least one application. Therefore, the item use authority information may include application execution authority information, execution authority information with respect to a particular function provided in an application, and folder execution authority information.

If the use authority information includes home background screen information, the controller 140 may reconstitute a screen so that the screen has a home background screen corresponding to the home background screen information, by using the home background screen information corresponding to the user mode.

For convenience of description, hereinafter, a user control input corresponds to an unlocking control input using an unlocking pattern, a first unlocking pattern corresponds to a host mode, and a second unlocking pattern corresponds to a guest mode. In this case, if the first unlocking pattern is input/performed, the controller 140 may set the user terminal apparatus 100 to the host mode. The controller 140 may reconstitute a screen so that the screen has a first home background screen corresponding to first home background screen information, by using the first home background screen information corresponding to the host mode. If the second unlocking pattern is input/performed, the controller 140 may set the user terminal apparatus 100 to the guest mode. The controller 140 may reconstitute a screen so that the screen has a second home background screen corresponding to second home background screen information, by using the second home background screen information corresponding to the guest mode. This will now be described in more detail with reference to FIGS. 3A through 3D.

Figure 3A:
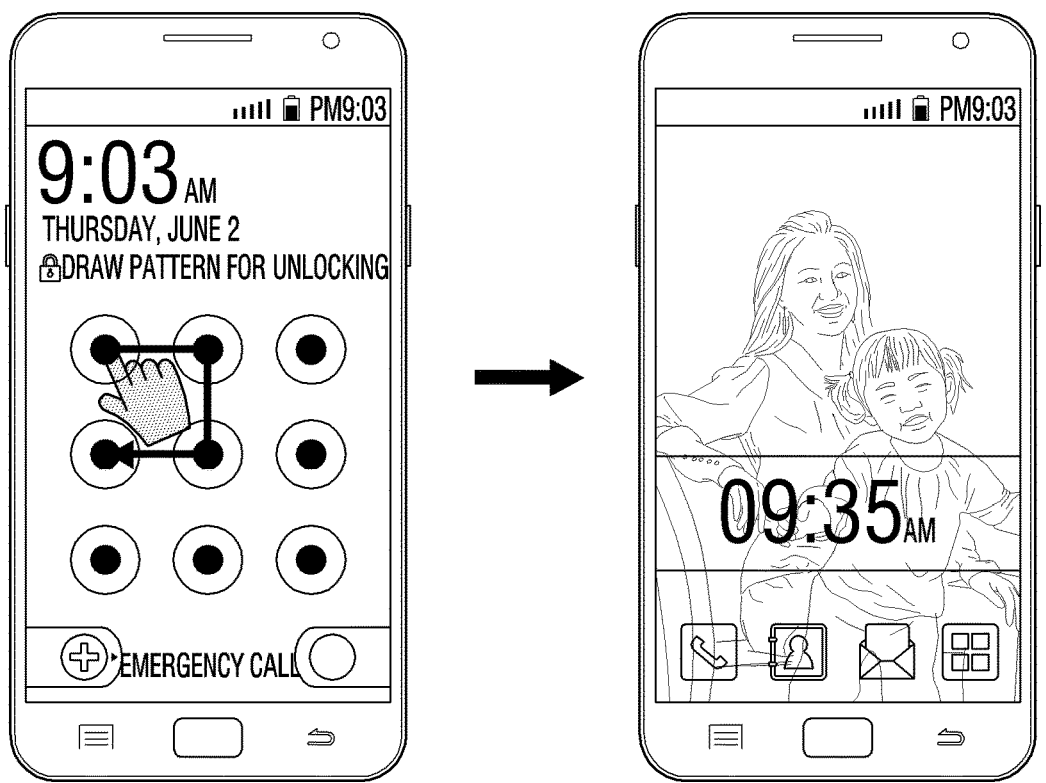
FIGS. 3A 3B are views illustrating an unlocking screen including a home background screen corresponding to an unlocking control input according to an exemplary embodiment.
Figure 3B:
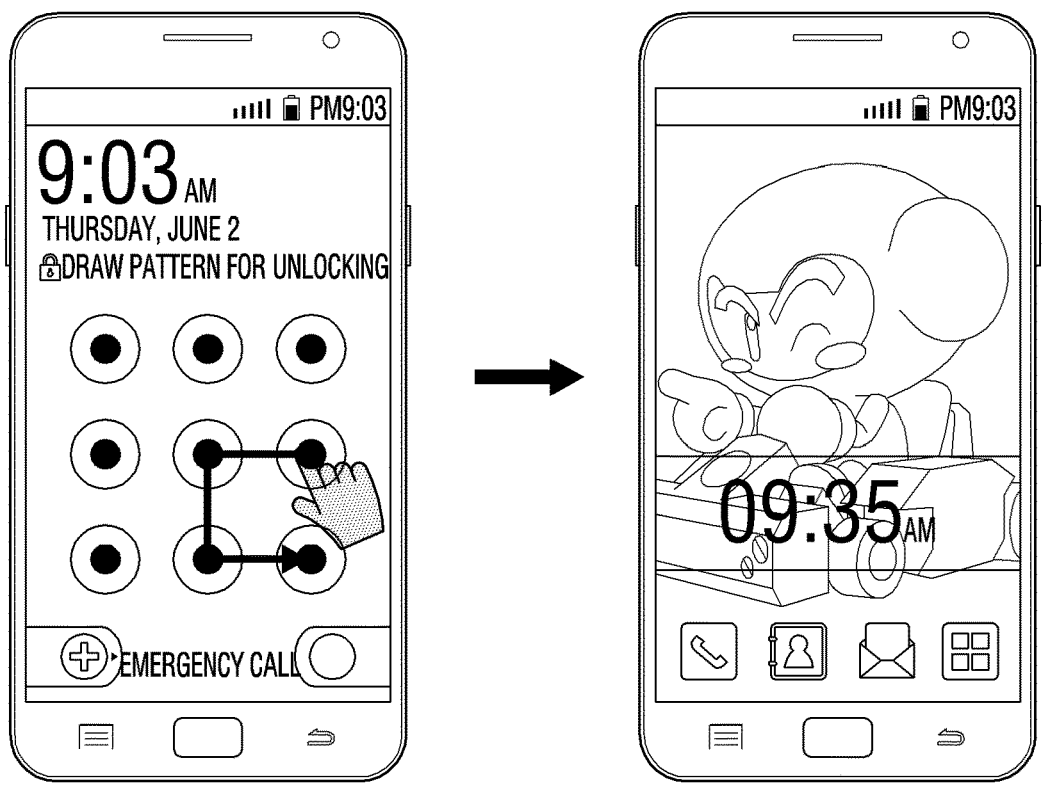

FIGS. 3A and 3B are views illustrating a screen having a home background screen corresponding to a user mode, according to an exemplary embodiment.

As shown in FIG. 3A, if a user inputs/performs a first unlocking pattern corresponding to a host mode, a screen having a home background screen may be displayed. As shown in FIG. 3B, if the user inputs/performs a second unlocking pattern corresponding to a guest mode, a screen having a home background screen may be displayed.

Therefore, when the host of the user terminal apparatus 100 uses the user terminal apparatus 100, the first unlocking pattern may be input to allow the host to use a screen having a desired home background screen. However, when a guest, such as a son of the host of the user terminal apparatus 100 for example, uses the user terminal apparatus 100, the host or the guest may input the second unlocking pattern to use a screen having a character that children like as a home background screen.

If the host of the user terminal apparatus 100 prefers privacy, a screen having a background screen in the guest mode, different from a background screen in the host mode, may be generally provided by using an unlocking pattern different from an unlocking pattern used by the host.

As described above, a customized background screen may be provided according to a user mode to contribute to the convenience and taste of the user.

If the use authority information includes item use authority information, the controller 140 may generate at least one page screen including only executable items by using the item use authority information corresponding to a user mode and reconstitute each page of the screen according to the generated at least one page screen.

For convenience of description, hereinafter, a user control input corresponds to an unlocking control input using an unlocking pattern, a first unlocking pattern corresponds to a host mode, and a second unlocking pattern corresponds to a guest mode. In this case, if the first unlocking pattern is input/performed, the controller 140 may set the user terminal apparatus 100 to the host mode. The controller 140 may also generate at least one page screen including only executable items by using first item use authority information corresponding to the host mode. The controller 140 may reconstitute each page of the screen according to the generated at least one page screen. If the second unlocking pattern is input/performed, the controller 140 may set the user terminal apparatus 100 to the guest mode. The controller 140 may also generate at least one page screen including only executable items by using second item use authority information corresponding to the guest mode. The controller 140 may also reconstitute each page of the screen according to the generated at least one page screen. This will now be described in more detail with reference to FIGS. 4A through 4D.

Figure 4A:
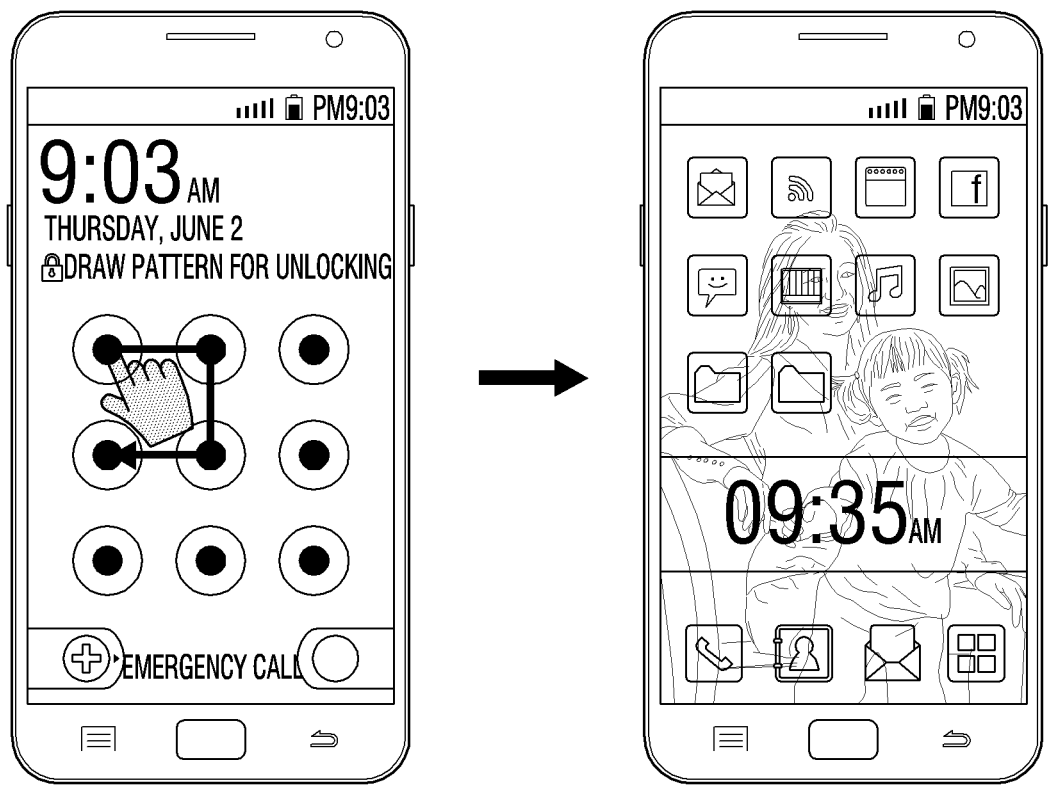
FIGS. 4A and 4B are views illustrating an unlocking screen including a screen displaying executable applications corresponding to an unlocking control input according to an exemplary embodiment.
Figure 4B:
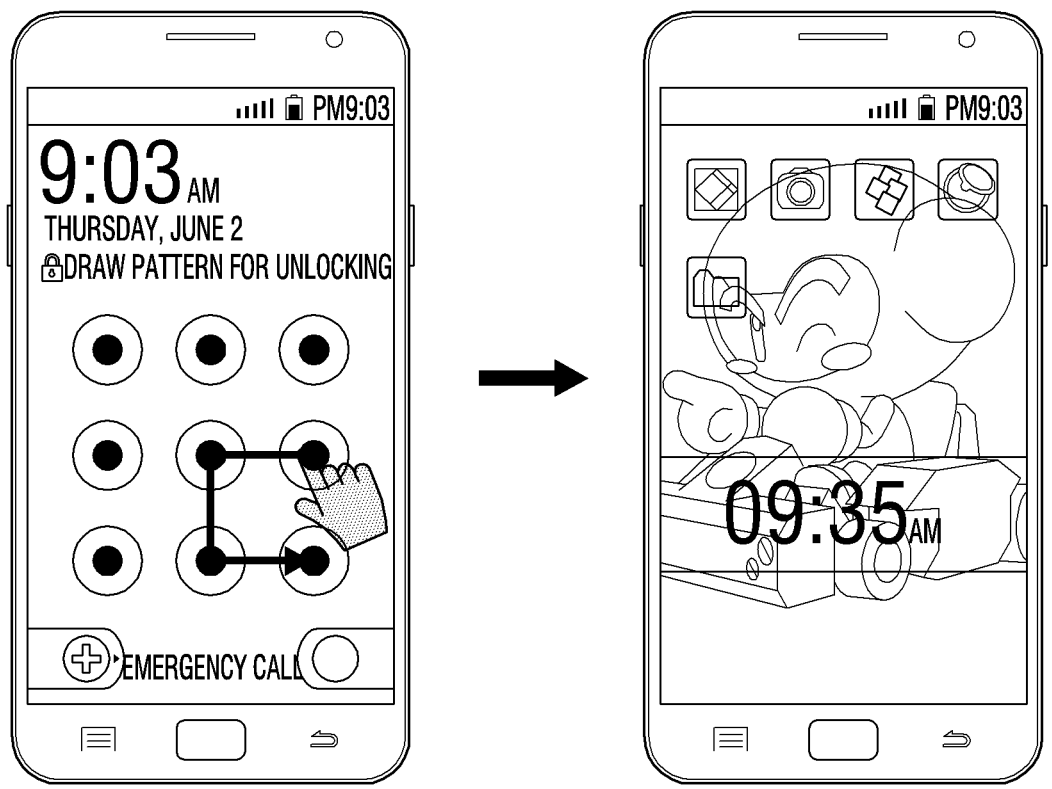

FIGS. 4A and 4B are views illustrating a page screen including only executable items corresponding to a user mode, according to an exemplary embodiment.

As shown in FIG. 4A, if a user inputs/performs a first unlocking pattern corresponding to a host mode, at least one page screen including only executable items corresponding to the first unlocking pattern is generated, and each page of the screen is reconstituted according to the generated at least one page screen.

As shown in FIG. 4B, if the user performs a second unlocking pattern corresponding to a guest mode, at least one page screen including only executable items corresponding to the second unlocking pattern is generated, and each page of the screen is reconstituted according to the generated at least one page screen.

Therefore, when the host of the user terminal apparatus 100 uses the user terminal apparatus 100, the host may input the first unlocking pattern to display a page screen including items executable by the host as shown in FIG. 4A. In this case, the host may display a page screen including all items.

However, when a guest, such as the son of the host for example, uses the user terminal apparatus 100, the host or the guest may input the second unlocking pattern to display a page screen including only executable applications as shown in FIG. 4B. In this case, in order to prevent unauthorized usage by the guest, a page screen, including applications or folders unrelated to privacy of the host, excluding a call application, a contact number application, a message application, and a menu application, may be displayed. A page screen may be displayed excluding applications usable by users over 19 years old, for example.

Also, if the host of the user terminal apparatus 100 does not want to open privacy to other persons, the host may generally use an unlocking pattern different from an unlocking patterned used by the host to display an unlocking screen excluding applications (for example, the call application, the message application, the contact number application, and an album application) related to the privacy of the host. Therefore, privacy of an owner of the user terminal apparatus 100 may be protected.

As described above, a page screen including only a customized executable application may be provided according to an input selected user mode to contribute to convenience and privacy of a user.

If the use authority information includes item use authority information, the controller 140 may generate at least one first page screen including only executable items and at least one second page screen including only un-executable items by using the item use authority information corresponding to a user mode, and reconstitute each page of the screen according to the generated first and second page screens. Here, an identifier indicating lack of authority to execute may be displayed on the second page screen.

For convenience of description, hereinafter, a user control input corresponds to an unlocking control input using an unlocking pattern, a first unlocking pattern corresponds to a host mode, and a second unlocking pattern corresponds to a guest mode. In this case, if the first unlocking pattern is performed, the controller 140 may set the user terminal apparatus 100 to the host mode. The controller 140 may also generate at least one page screen including only executable items and at least one second page screen including only un-executable items by using first item use authority information corresponding to the host mode, and reconstitute each page of the screen according to the generated first and second page screens. If the second unlocking pattern is performed, the controller 140 may set the user terminal apparatus 100 to the guest mode. The controller 140 may also generate at least one first page screen including only executable items and at least one second page screen including only un-executable items by using second item use authority information corresponding to the guest mode and reconstitute each page of the screen according to the generated first and second page screens. This will now be described in more detail with reference to FIG. 5.

Figure 5:
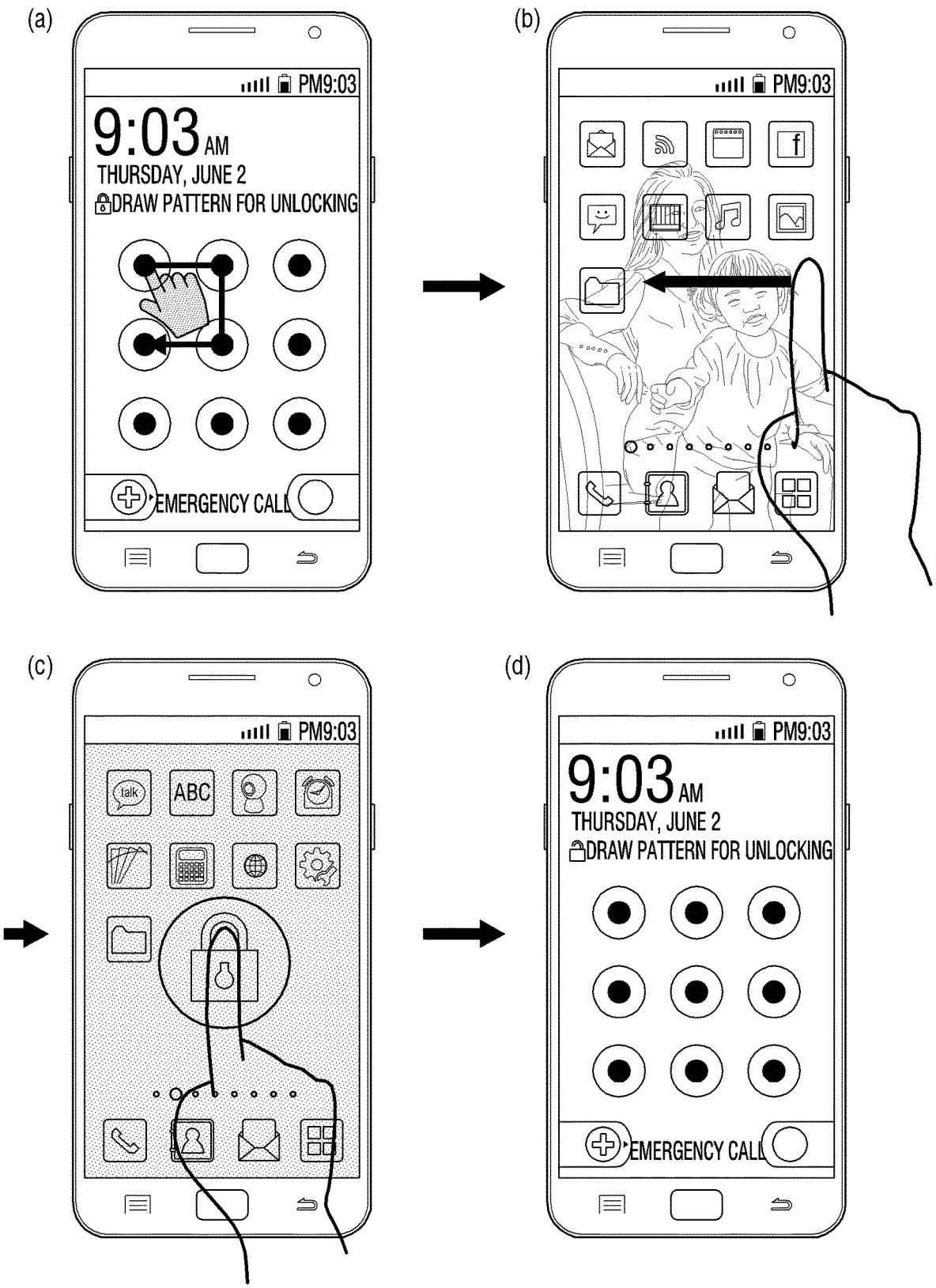
FIG. 5 is views illustrating an unlocking screen including contents/menus corresponding to an unlocking control according to an exemplary embodiment.

FIG. 5 illustrates at least one first page screen including only executable items and at least one second page screen including only un-executable items corresponding to a user mode, according to an exemplary embodiment. If a user performs an unlocking pattern corresponding to a guest mode or a host mode as shown in view (a) of FIG. 5, at least one first page screen including only executable items as shown in view (b) of FIG. 5 and at least one second page screen including only un-executable items as shown in view (c) of FIG. 5 may be generated by using use authority information corresponding to the guest mode or the host mode. If an identifier indicating an un-execution is selected as shown in view (c) of FIG. 5, a screen for inputting a user control input for selecting a user mode may be displayed on the whole screen as shown in view (d) of FIG. 5. However, the screen for inputting the user control input for selecting the user mode may be displayed on a divided portions of the screen different from that shown in view (d) of FIG. 5.

Therefore, when the host of the user terminal apparatus 100 uses the user terminal apparatus 100, all page screens may be selectable.

When a guest, such as the son of the owner of the user terminal apparatus 100, uses the user terminal apparatus 100, a page screen including only items executable by children and a page screen including only items un-executable by children may be provided. In this case, to prevent unauthorized usage by the guest, a call application, a contact number application, a message application, and other applications appropriate for use by adults over 19 years old may be displayed on a page screen including only un-executable items, and a game application, for example, unrelated to privacy of the host may be displayed on a page screen including only executable items.

If the host of the user terminal apparatus 100 prefers privacy, the host may set the user terminal apparatus 100 to the guest mode to constitute and provide a page screen with executable items, including only items that are unrelated to privacy of the host. Therefore, privacy of the host of the user terminal apparatus 100 may be protected.

As described above, a customized page screen corresponding to a user mode may be provided to contribute to convenience and privacy of the user.

Also, if the use authority information includes item use authority information, the controller 140 may generate at least one page screen including executable items and un-executable items by using item use authority information corresponding to a user mode and reconstitute each page of the screen according to the generated at least one page screen. Here, the un-executable item may include an identifier indicating lack of authority.

For convenience of description, hereinafter, a user control input corresponds to an unlocking control input using an unlocking pattern, a first unlocking pattern corresponds to a host mode, and a second unlocking pattern corresponds to a guest mode. In this case, if the first unlocking pattern is input/performed, the controller 140 may set the user terminal apparatus 100 to the host mode. The controller 140 may also generate at least one page screen including executable items and unexecutable items by using first item use authority information corresponding to the host mode and reconstitute each page of the screen according to the generated at least one page screen. If the second unlocking pattern is input/performed, the controller 140 may set the user terminal apparatus 100 to the guest mode. The controller 140 may also generate at least one page screen including executable items and un-executable items by using second item use authority information corresponding to the guest mode and reconstitute each page of the screen according to the generated at least one page screen. This will now be described in more detail with reference to FIGS. 6A through 6C.

Figure 6:
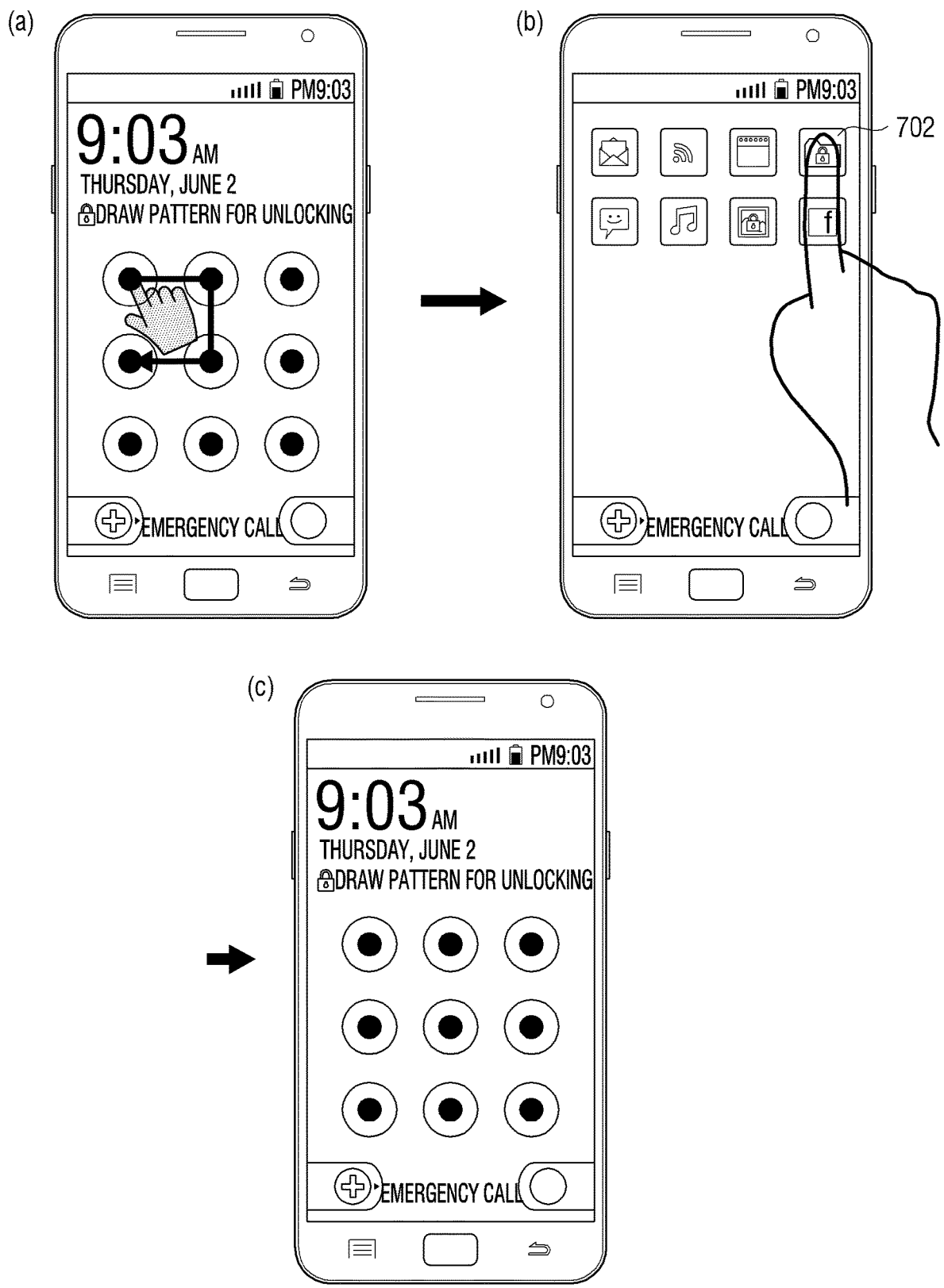
FIG. 6 is views illustrating an unlocking screen including a page screen corresponding to an unlocking control according to an exemplary embodiment.

FIG. 6 is views illustrating at least one page screen including executable items and un-executable items corresponding to a user mode, according to an exemplary embodiment. If a user inputs/performs an unlocking pattern corresponding to a guest mode or a host mode as shown in view (a) of FIG. 6, at least one page screen including executable items and un-executable items as shown in view (b) of FIG. 6 may be generated by using item use authority information corresponding to the guest mode or the host mode. Here, an identifier indicating lack of authority may be displayed along with the un-executable items. If the identifier indicating lack of authority is selected as shown in view (b) of FIG. 6, a screen for inputting a user control input for selecting a user mode may be displayed on a whole screen as shown in view (c) of FIG. 6. Here, the screen for inputting the user control input for selecting the user mode may be displayed on a divided portions of the screen different from that shown in view (c) of FIG. 6.

Therefore, when the host of the user terminal apparatus 100 uses the user terminal apparatus 100, a page screen including all items, set as executable, may be provided.

However, when a guest, such as the son of the owner of the user terminal apparatus 100 for example, uses the user terminal apparatus 100, a page screen including items executable by children may be provided and an identifier indicating lack of authority may be displayed on a folder related to privacy of the host, a call application, a contact number application, applications appropriate for use by adults over 19 years old, and a message application, for example.

If the host of the user terminal apparatus 100 prefers privacy, the host may set the user terminal apparatus 100 to the guest mode through an unlocking control input in order to set an item that the host does not want others to access to be unusable or blocked from usage. Therefore, the privacy of the host of the user terminal apparatus 100 may be protected.

As described above, a customized page screen corresponding to a user mode may be provided to contribute to the convenience and privacy of a user.

Here, in the exemplary embodiments described with reference to FIGS. 5 and 6, the user terminal apparatus 100 includes an unselectable page screen or unselectable items. Therefore, the exemplary embodiments of FIGS. 5 and 6 are different from the exemplary embodiment of FIGS. 4A and 4B in which the user terminal apparatus 100 displays only executable items.

In the exemplary embodiments described with reference to FIGS. 4A through 6, an application provided according to a host mode or a guest mode may be an application, a particular function execution authority of which is limited. In detail, the controller 140 may reset a particular function execution authority provided in an application to reconstitute a screen and display the application by using particular function execution authority information provided in an application corresponding to a user mode. Here, the resetting of the particular function execution authority provided in the application may be performed by an operating system (OS).

For example, if a past album display function is limited in a photo application in guest mode, and the photo application is executed, a past album may not be displayed on a photo list. If a past message display function is limited in a message application in guest mode, and the message application is executed, a past message may not be displayed on a message list. If an automatic access function is limited in an SNS application in guest mode, and the SNS application is executed, an automatic access to an SNS may not be performed. If a call function is limited for a preset time in a call application in guest mode, the call application is executed, and a call is performed for the preset time, a call function of the user terminal apparatus 100 may be limited.

Here, an identifier indicating that a particular function execution authority is limited may be displayed in an application in which a particular function execution authority is limited. The identifier may be displayed as a lock icon. However, the present general inventive concept is not limited thereto, and thus various types of icons capable of providing identifying information to a user may be used.

Also, an identifier indicating lack of authority may be displayed as a lock icon as shown in FIGS. 5 through 7B. However, the present general inventive concept is not limited thereto, and thus various types of icons capable of providing identifying information to the user may be used.

The identifier indicating that the particular function execution authority is limited may be displayed in a different position, a different shape, or a different color from an identifier indicating that an application is not selectable.

If use authority information includes item information to be executed, the controller 140 may reconstitute a screen so that the screen has an execution screen corresponding to the item information, by using the item information corresponding to a user mode.

For convenience of description, hereinafter, a user control input corresponds to an unlocking control input using an unlocking pattern, a first unlocking pattern corresponds to a host mode, and a second unlocking pattern corresponds to a guest mode. In this case, if the first unlocking pattern is input/performed, the controller 140 may set the user terminal apparatus 100 to the host mode. If the user terminal apparatus 100 is unlocked, the controller 140 may immediately execute an item corresponding to item information to be executed by using the item information corresponding to the host mode. Therefore, the controller 140 may reconstitute a screen so that the screen has an execution screen corresponding to item information to be executed. If the second unlocking pattern is input/performed, the controller 140 may set the user terminal apparatus 100 to the guest mode. If the user terminal apparatus 100 is unlocked, the controller 140 may execute an item corresponding to the item information to be executed, by using the item information corresponding to the guest mode. Therefore, the controller 140 may reconstitute a screen so that the screen has an execution screen corresponding to the item information to be executed. This will now be described in more detail with reference to FIGS. 7A and 7B.

Figure 7A:
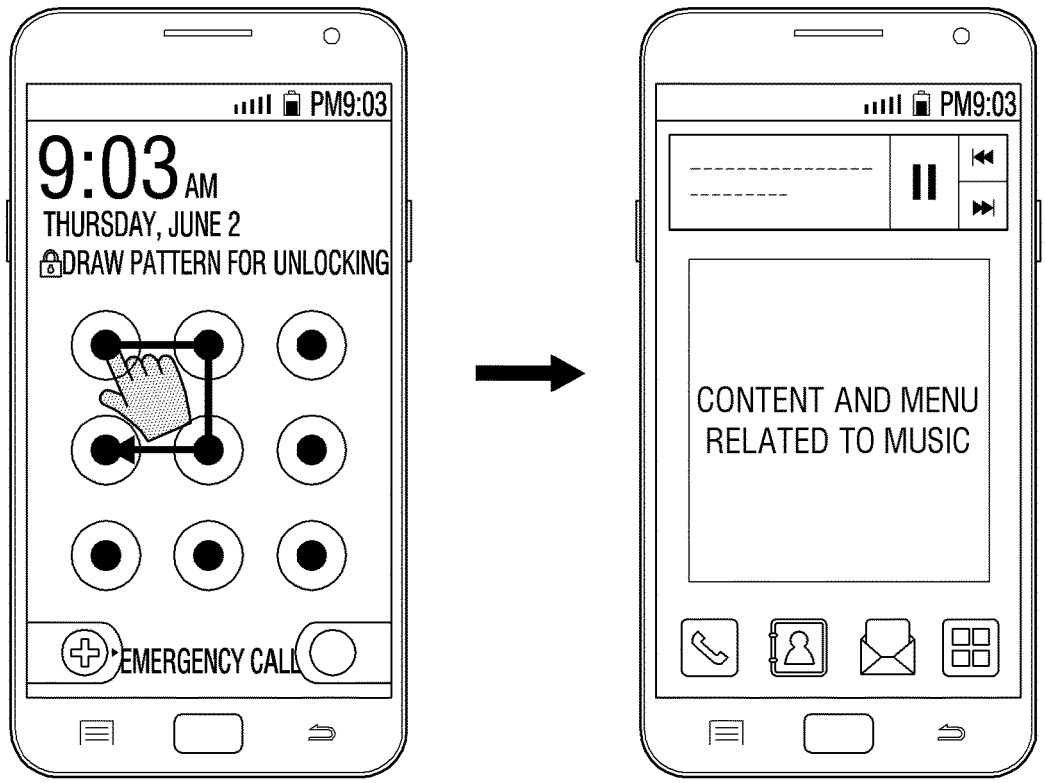
FIGS. 7A 7B are views illustrating an unlocking screen including a screen displaying an application with contents and menus corresponding to an unlocking control input according to an exemplary embodiment.
Figure 7B:
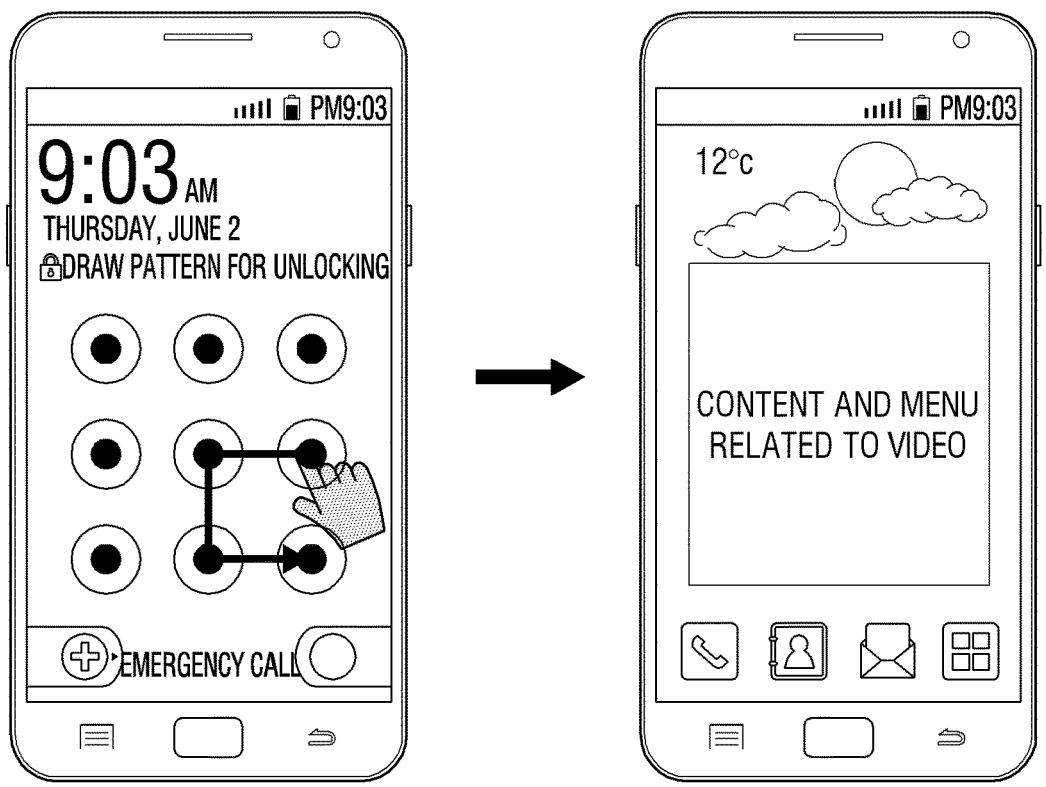

As shown in FIG. 7A, if a user performs a first unlocking pattern corresponding to a host mode, a music application corresponding to the first unlocking pattern may be executed, and a screen including a content and a menu screen related to the executed music application may be displayed. As shown in FIG. 7B, if the user performs a second unlocking pattern corresponding to a guest mode, a video application corresponding to the second unlocking pattern may be executed, and a screen including a content and a menu screen related to the executed video application may be displayed.

Therefore, the host of the user terminal apparatus 100 may perform an unlocking control input corresponding to a function that the host wants to execute, to conveniently use a content and a menu screen related to a particular function. In other words, the host of the user terminal apparatus 100 may conveniently use the content and the menu screen related to the particular function without an additional control besides an input of an unlocking control input.

If a user mode corresponding to a input/performed unlocking control input is the host mode, the controller 130 may reconstitute and display a screen based on setting information corresponding to the host mode stored in the storage 120. However, if the user mode corresponding to the input/performed unlocking control input is the guest mode, the controller 140 may download an application stored in an external server and display the downloaded application. In other words, if the user mode corresponding to the input/performed unlocking control input is the guest mode, the controller 140 may transmit a control signal to the external server and download an application corresponding to the guest mode from the external server. Here, the external server may be a cloud server that operates along with the user terminal apparatus 100.

If use authority information includes communication service use authority information, the controller 140 may set a communication service use authority of the user terminal apparatus 100 by using the communication service use authority information corresponding to a user mode. Here, the communication service use authority information may include usable communication service information, such as Wi-Fi, 3G, or 4G usable data communication capacity information, etc.

For convenience of description, hereinafter, a user control input corresponds to an unlocking control input using an unlocking pattern, a first unlocking pattern corresponds to a host mode, and a second unlocking pattern corresponds to a guest mode. If the first unlocking pattern is input/performed, the controller 140 may set the user terminal apparatus 100 to the host mode. If the user terminal apparatus 100 is set to the host mode, the controller 140 may set the user terminal apparatus 100 to use all usable communication services, such as Wi-Fi, 3G, 4G, etc., and a usable data capacity.

If the second unlocking pattern is input/performed, the controller 140 may set the user terminal apparatus 100 to the guest mode. If the user terminal apparatus 100 is set to the guest mode, the controller 140 may set the user terminal apparatus 100 to limit a communication service only to Wi-Fi and a usable data capacity to a preset capacity. However, this is only an exemplary embodiment of present general inventive concept, and thus the controller 140 may set the user terminal apparatus 100 to various states. For example, the communication service may be set not to be used at all in the guest mode.

The controller 140 may also execute an application corresponding to an unlocking control input. For convenience of description, an unlocking control input corresponds to an unlocking control input using an unlocking pattern. If a first unlocking pattern is input/performed, the controller 140 may execute a first application corresponding to the first unlocking pattern. If a second unlocking pattern is performed, the controller 140 may execute a second application corresponding to a second unlocking pattern. If an $n^{th}$ unlocking pattern is performed, the controller 140 may execute an $n^{th}$ application corresponding to the $n^{th}$ unlocking pattern.

As described above, an application corresponding to an input unlocking control input may be immediately executed to contribute to the convenience of a user.

The controller 140 may reconstitute a screen including an identifier, displaying a user mode selected, on the screen based on a user control input. Here, if the identifier displaying the selected user mode is selected, the controller 140 may control the display unit 110 to display a screen for inputting a user control input for selecting a user mode on a whole portion or a divided portion of a screen. This will now be described in more detail with reference to FIGS. 8A through 8F.

Figure 8:
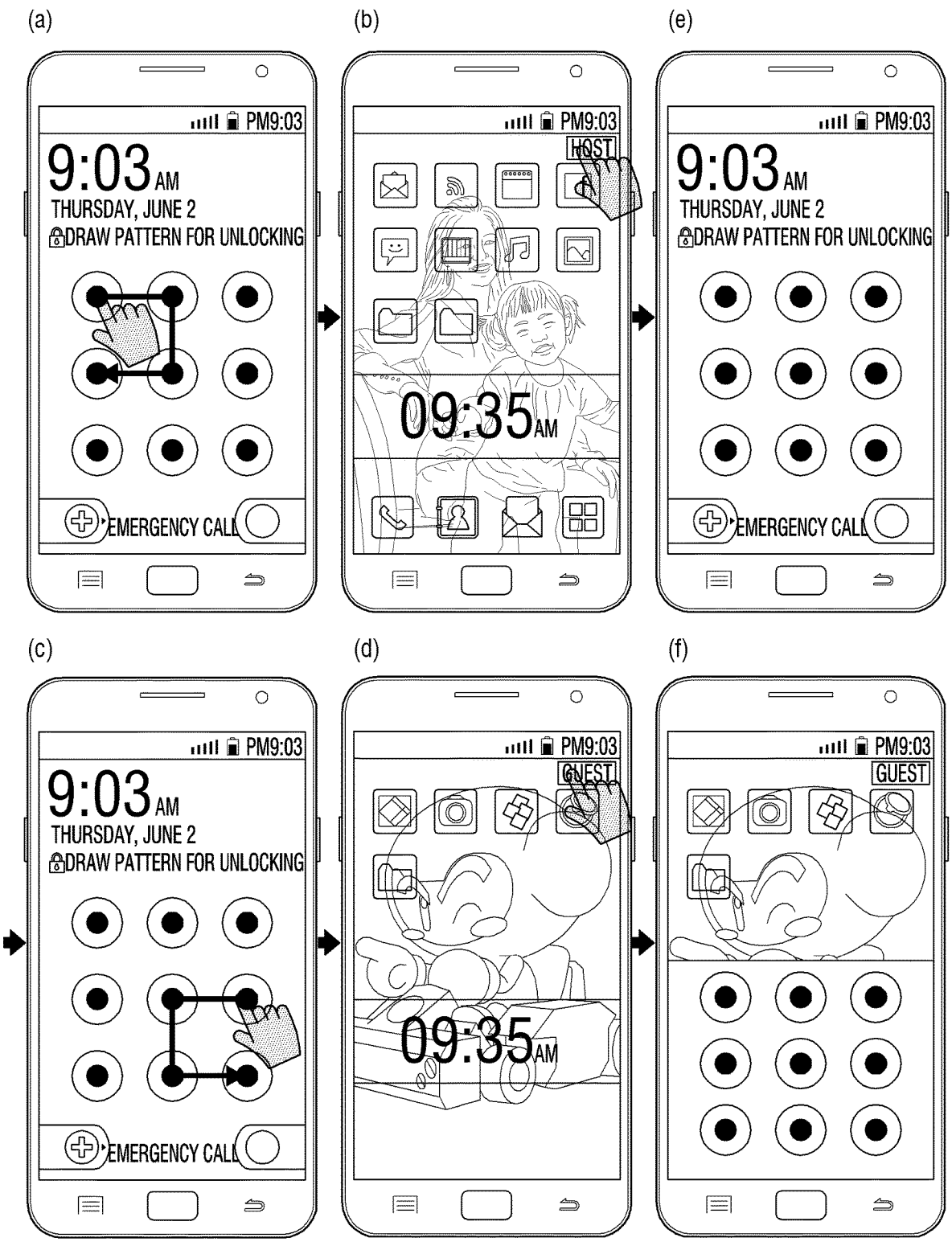
FIG. 8 is views illustrating a screen including an identifier displaying a selected user mode according to an exemplary embodiment.

FIG. 8 is views illustrating a screen including an identifier displaying a selected user mode, according to an exemplary embodiment. If a user inputs/performs an unlocking pattern corresponding to a host mode as shown in view (a) of FIG. 8, a screen including an identifier displaying the host mode may be displayed as shown in view (b) of FIG. 8. If the user performs an unlocking pattern corresponding to a guest mode as shown in view (c) of FIG. 8, a screen including an identifier displaying the guest mode may be displayed as shown in view (d) of FIG. 8. Here, if the identifier displaying the host mode or the guest mode is selected, a screen for inputting a user control input for selecting a user mode may be displayed on a whole portion of a screen as shown in view (e) of FIG. 8 or on a divided portion of the screen as shown in view (f) of FIG. 8.

The controller 130 may include a central processing unit (CPU), a ROM that stores a control program, and a RAM that stores input data or is used as a job-related memory area. Here, the CPU, the ROM, and the RAM may be connected to one another through an internal bus.

Figure 11:
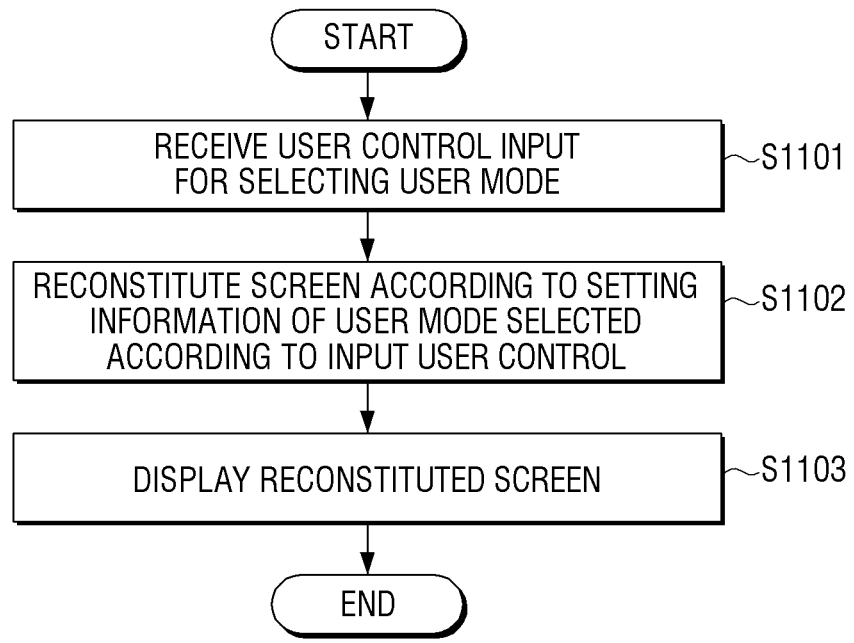
FIG. 11 is a flowchart illustrating a method of controlling a user terminal apparatus according to an exemplary embodiment.

FIG. 11 is a flowchart illustrating a method of controlling a user terminal apparatus according to an exemplary embodiment. Referring to FIG. 11, in operation S1101, a user control input for selecting a user mode is input. Here, the user mode may include a host mode in which a use authority to all functions provided in a user terminal apparatus is given and a guest mode in which a limited use authority to functions provided in the user terminal apparatus is given.

The user control input is an unlocking control input for unlocking the user terminal apparatus, and the unlocking of the user terminal apparatus may be performed through an unlocking pattern recognition, an unlocking password recognition, an unlocking voice recognition, an unlocking face recognition, or an unlocking iris recognition.

In operation S1102, a screen is reconstituted according to use authority information of a user mode selected according to the input/performed user control input. Here, the use authority information may include at least one of home background screen information, item use authority information, item information to be executed, and communication service use authority information. The item use authority information may include application execution authority information, authority information with respect to an execution of a function provided in an application, and folder execution authority information.

In detail, if the use authority information includes the home background screen information, the screen may be reconstituted to have a home background screen corresponding to the home background screen information, by using the home background screen information corresponding to the user mode.

If the use authority information includes the item use authority information, the reconstituting of the screen may include: generating at least one page screen including only executable items by using the item use authority information corresponding to the user mode; and reconstituting each page of the screen according to the generated at least one page screen If the use authority information includes the item use authority information, the reconstituting of the screen may include: generating at least one first page screen including only executable items and at least one second page screen including only un-executable items by using the item use authority information corresponding to the user mode; and reconstituting each page of the screen by using the first and second page screens. Here, an identifier indicating lack of authority may be displayed on the second page screen.

If the use authority information includes item use authority information, the reconstituting of the screen may include: generating at least one page screen including executable items and un-executable items by using item use authority information corresponding to a user mode; and reconstituting each page of the screen according to the generated at least one page screen. Here, an identifier indicating lack of authority may be displayed on the un-executable items.

If the use authority information includes item information to be executed, the screen may be reconstituted to have an execution screen corresponding to item information to be executed by using the item information corresponding to a user mode.

The screen may also be reconstituted to include an identifier displaying a user mode selected according to a user control input on the screen.

In operation S1103, the reconstituted screen is displayed.

If the identifier indicating the lack of authority is selected, the method of controlling the user terminal apparatus may further include: displaying a screen for inputting/performing a user control input for selecting a user mode on a whole portion or a divided portion of a screen.

If an identifier displaying the selected user mode is selected, the method may further include: displaying a screen for inputting/performing a user control input for selecting a user mode on a whole portion or a divided portion of a screen.

The method may further include: displaying a screen for inputting/performing a user control input corresponding to the guest mode and the host mode.

The method may further include: displaying a screen for inputting use authority information corresponding to a user mode.

Figure 12:
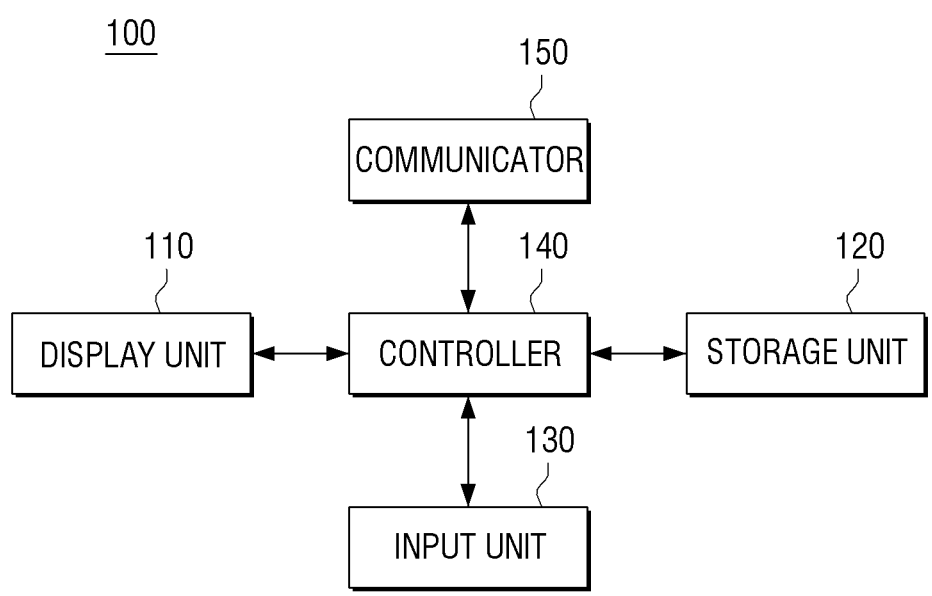
FIG. 12 is a block diagram illustrating a user terminal apparatus according to another exemplary embodiment.

FIG. 12 is a block diagram illustrating a user terminal apparatus 100 according to another exemplary embodiment. Referring to FIG. 12, the user terminal apparatus 100 includes all or some of a display unit 110, a storage unit 120, an input unit 130, a controller 140, and a communicator 150. Detailed description of the elements of FIG. 12 which are same as those described in the previous exemplary embodiment will be omitted.

The communicator 150 connects the user terminal apparatus 100 to an external apparatus. In particular, if an application, which has a function of controlling an external apparatus in a network through the user terminal apparatus 100, is executed in the user terminal apparatus 100, the communicator 150 transmits a control signal for controlling the external apparatus to the external apparatus. Here, the external apparatus may be apparatuses that are connected to various types of networks such as a home network, a car network, a company network, etc.

Here, the communicator 150 is configured to connect the user terminal apparatus 100 to the external apparatus according to a wireless method or a wire method through a local area network (LAN) and the Internet, through a universal serial bus (USB) port, through a mobile communication network such as 3G or 4G, or through a near field communication (NFC) method such as Bluetooth, NFC, radio frequency identification (RFID), Zigbee, or the like.

The controller 140 controls an overall operation of the user terminal apparatus 100. In detail, the controller 140 may control all or some of the display unit 110, the storage unit 120, the input unit 130, and the communicator 150.

In particular, if an application, which has a function of controlling an external apparatus in the network through the user terminal apparatus 100, is executed, the controller 140 may generate a control signal for controlling the external apparatus in the network according to environment information corresponding to a user mode.

Specifically, if the application, which has the function of controlling an external apparatus in the network through the user terminal apparatus 100, is executed, the controller 140 may broadcast a profile request signal through the communicator 150 to search the network for a controllable external apparatus. If profiles are respectively received from external apparatuses through the communicator 150 in response to the profile request signal, the controller 140 may search the network for a plurality of controllable external apparatuses by using the received profiles.

If the plurality of controllable external apparatuses are searched in the network, the controller 140 may detect environment information of each of the plurality of controllable external apparatuses corresponding to a user mode.

Here, the environment information refers to setting information of a user with respect to an external apparatus. For example, if a searched external apparatus is a TV, the environment information may be channel information, volume information, image quality information, recent viewing list information, or the like. If the searched external apparatus is an air conditioner, the environment information may be temperature information, air volume information, or the like. If the searched external apparatus is a washing machine, the environment information may be temperature information of water, washing information, or the like. If the searched external apparatus is a closed-circuit television (CCTV), the environment information may be operation on/off information. If the searched external apparatus is a robot cleaner, the environment information may be operation on/off information. If the searched external apparatus is a boiler, the environment information may be boiler operation on/off information, temperature information, or the like. If the searched external apparatus is a lighting apparatus, the environment information may be brightness information, power on/off information, or the like.

The environment information may be pre-set according to a host mode and a guest mode in an application having a function of controlling an external apparatus in the network through the user terminal apparatus 100. For example, if the searched external apparatus is a TV, environment information, such as "channel information: CH11", "volume information: VOLUME 20", "image quality information: HD", etc., may be pre-set in the host mode, and environment information, such as "channel information: CH9" "volume information: VOLUME 10", "image quality information: SD", etc., may be pre-set in the guest mode.

In this case, if a user mode corresponding to a input/performed user control input is the host mode, the controller 140 may detect environment information of each of a plurality of searched external apparatuses corresponding to the host mode. If the user mode corresponding to the input/performed user control input is the guest mode, the controller 140 may detect environment information of each of a plurality of searched external apparatuses corresponding to the guest mode.

If environment information corresponding to the host mode or the guest mode is detected, the controller 140 may control the communicator 150 to transmit a control signal including the environment information to a plurality of searched external apparatuses. For example, if the detected environment information is channel information, volume information, image quality information, or recent viewing list information, the controller 140 may control the communicator 150 to transmit a control signal including the detected environment information to the TV. If the detected environment information is temperature information or volume information of an air conditioner, the controller 140 may control the communicator 150 to transmit a control signal including the detected environment information to the air conditioner.

Therefore, environments of a plurality of external apparatuses searched in a network may be automatically set according to environment information corresponding to a host mode or a guest mode. This will now be described in more detail with reference to FIGS. 13A through 14B.

FIGS. 13A through 14B are views illustrating methods of controlling external apparatuses according to exemplary embodiments.

Figure 13A:
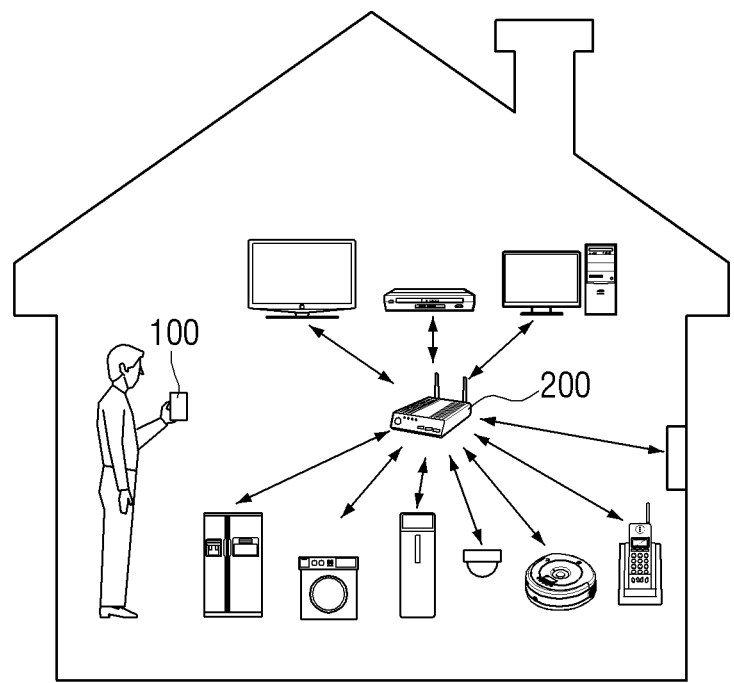
FIGS. 13A through 14B are views illustrating methods of controlling external apparatuses according to exemplary embodiments.

Referring to FIG. 13A, if a user sets a user mode, enters a home and executes an application having a function of controlling an external apparatus in a home network through the user terminal apparatus 100, the user terminal apparatus 100 generates a control signal that includes environment information corresponding to the user mode to control the external apparatus in the home network.

In this case, the generated control signal may be transmitted to the apparatus in the home network through a management server 200 as shown in FIG. 13A. However, the present general inventive concept is not limited thereto, and thus the control signal may be directly transmitted to the apparatus in the home network.

Figure 13B:
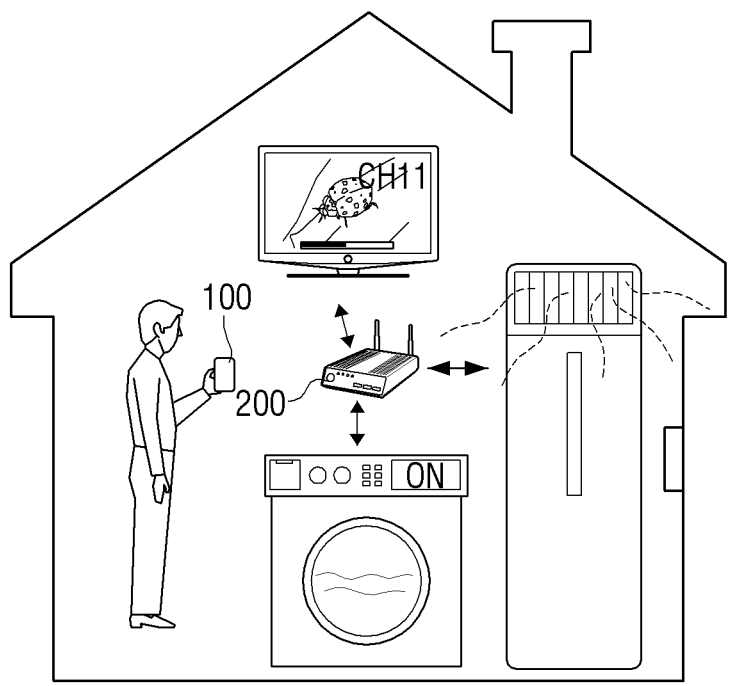

If the control signal is transmitted as described above, environments of external apparatuses in the home network may be set according to the control signal. For example, if environment information corresponding to a host mode includes environment information about a TV, a washing machine, and an air conditioner, the TV is turned on to adjust a channel to CH11 and adjust a volume, the washing machine is turned on to perform washing and the air conditioner is turned on to adjust a temperature and an air volume thereof as shown in FIG. 13B.

Figure 14A:
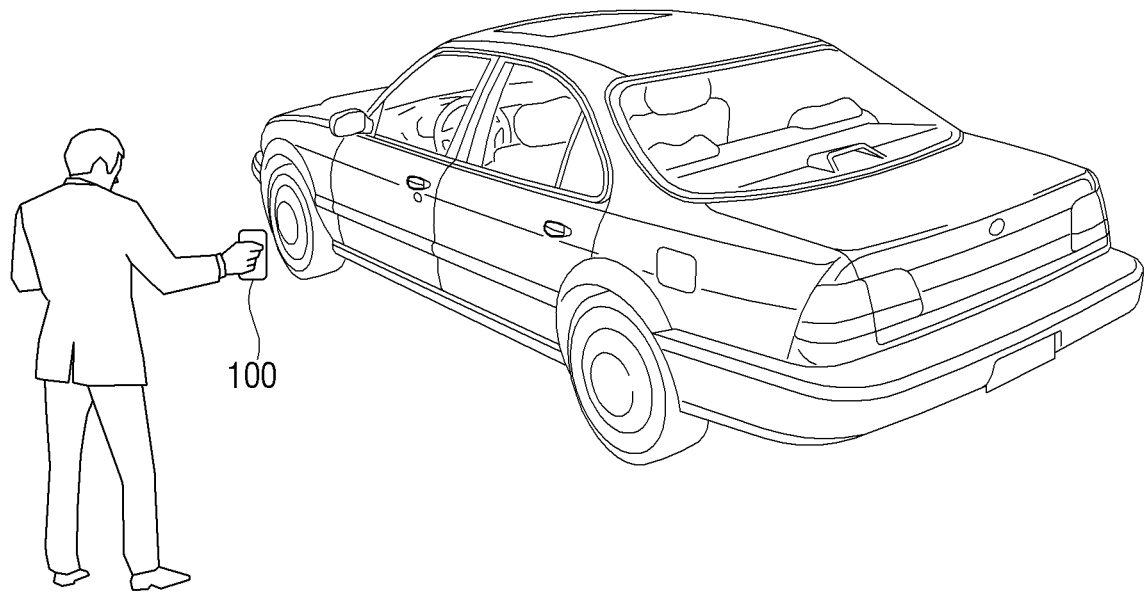

Referring to FIG. 14A, if a user sets a user mode and executes an application having a function of controlling an external apparatus in a car network through the user terminal apparatus 100 before the user enters a car, the user terminal apparatus 100 generates a control signal that includes environment information corresponding to the user mode to control the external apparatus in the car network.

Figure 14B:
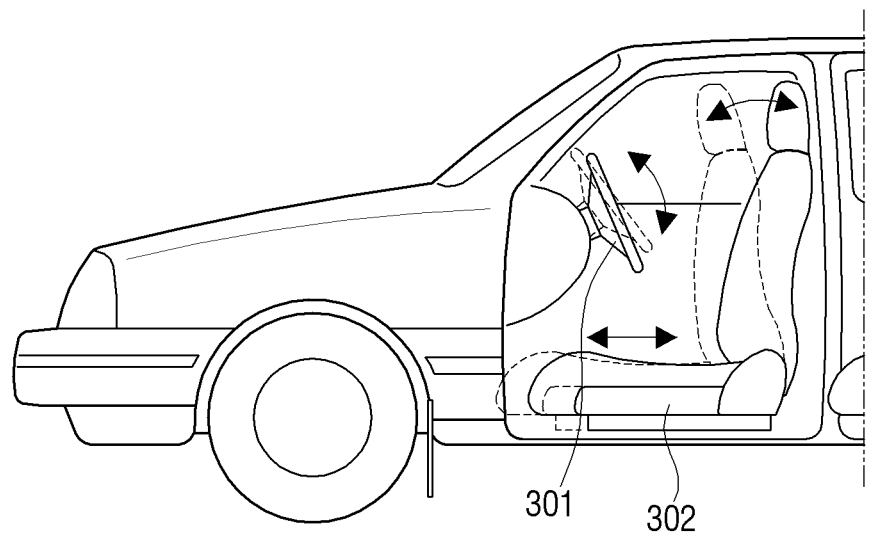

If the control signal is transmitted as described above, environments of external apparatuses in the car network may be set according to the control signal. For example, if environment information corresponding to a host mode includes environment information about a handle and a seat, a height of the handle is adjusted, and an inclination of a back of the seat, a height of the seat, a position of the seat, etc. are adjusted as shown in FIG. 14B.

A method of controlling a user terminal 100 apparatus and a method of controlling an external apparatus through the user terminal apparatus 100 according to various exemplary embodiments may be realized as program codes and stored on various types of non-transitory computer-readable media to be provided to servers or apparatuses.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a Blu-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device operating in one of a plurality of modes, the electronic device comprising:
   a touch display;
   a memory configured to store information related to an application; and
   a processor configured to:
      control the touch display to display a lock screen for receiving an unlock touch gesture, wherein the lock screen includes a plurality of user interface (UI) elements for receiving the unlock touch gesture,
      based on the touch display receiving a first unlock touch gesture corresponding to a first mode, control the touch display to display at least one icon of applications associated with the first mode, and
      based on the touch display receiving a second unlock touch gesture corresponding to a second mode, control the touch display to display at least one icon of applications associated with the second mode,
   wherein the processor is further configured to:
   control the touch display to display a first screen including a first icon for mode conversion and the at least one icon of applications associated with the first mode while the electronic device operates in the first mode, and
   based on the first icon for mode conversion being selected in the first mode, control the touch display to remove the first screen including the first icon for mode conversion and the at least one icon of applications associated with the first mode and display a first lock screen including the plurality of UI elements for receiving the unlock touch gesture, and
   wherein the processor is further configured to:
   control the touch display to display a second screen including a second icon for mode conversion and the at least one icon of applications associated with the second mode while the electronic device operates in the second mode, and
   based on the second icon for mode conversion being selected in the second mode, control the touch display to display a second lock screen including the plurality of UI elements for receiving the unlock touch gesture on the second screen while the at least one icon of applications associated with the second mode and the second icon for mode conversion are displayed on the second screen.

2. The electronic device of claim 1, wherein the unlock touch gesture is an unlock pattern.

3. The electronic device of claim 2, wherein the unlock pattern is an ordered sequence of touch inputs on the touch display.

4. The electronic device of claim 2, wherein the unlock pattern is one of a sequence or a series of touch inputs associated with one of a sequence or a series of locations on the touch display.

5. The electronic device of claim 2, wherein the unlock pattern is a sequence of directional drag touch inputs.

6. The electronic device of claim 2, wherein the unlock pattern is a connection of indices in a matrix.

7. The electronic device of claim 2, wherein the unlock pattern is a touch input drawn on an image displayed on the touch display.

8. The electronic device as claimed in claim 1, wherein the first and second modes have different use authorities for each of a plurality of applications which are stored in the electronic device.

9. The electronic device as claimed in claim 8, wherein the first mode is a host mode in which a use authority to all of the plurality of applications stored in the electronic device is given and the second mode is a guest mode in which only a use authority to a part of the plurality of applications is given.

10. The electronic device as claimed in claim 9, wherein the electronic device stores a camera application having a photographing function and an album function which displays a pre-photographed album,
wherein when the guest mode has a use authority only to the photographing function of the camera application, and the camera application is executed in the guest mode, the processor provides only the photographing function and limits the album function.

11. The electronic device as claimed in claim 10, wherein based on the first unlock touch gesture corresponding to the host mode being input, the processor controls the touch display to display a page screen corresponding to the host mode, and
based on the second unlock touch gesture corresponding to the guest mode being input, the processor controls the touch display to display a page screen corresponding to the guest mode.

12. The electronic device as claimed in claim 11, wherein the page screen corresponding to the guest mode includes a plurality of screens, and the at least one icon of applications associated with the second mode executable in the guest mode is arranged in a screen among the plurality of screens.

13. The electronic device as claimed in claim 12, wherein the processor controls the touch display to display a setting screen for receiving a selection of an application executable in the guest mode.

14. The electronic device as claimed in claim 13, wherein the electronic device stores a system environment setting application, and
wherein based on the system environment setting application being executed, the processor controls the touch display to display the setting screen.

15. The electronic device as claimed in claim 11, wherein the page screen has different home background screens for each of the plurality of modes.

16. The electronic device as claimed in claim 1, wherein the first and second modes have different function authorities for each of functions of an application.

17. The electronic device as claimed in claim 1, wherein based on a locked state of the electronic device being unlocked by the unlock touch gesture and an item being selected from among a plurality of items displayed on a page screen corresponding to the unlock touch gesture, the processor executes an application corresponding to the selected item.

18. The electronic device as claimed in claim 1, wherein the electronic device is a smart phone.

19. A method for controlling an electronic device operating in one of a plurality of modes, the method comprising:
displaying a lock screen on a display of the electronic device, wherein the lock screen includes a plurality of user interface (UI) elements for receiving an unlock touch gesture;
receiving the unlock touch gesture;
displaying, based on receiving a first unlock touch gesture corresponding to a first mode, at least one icon of applications associated with the first mode on the display of the electronic device; and
displaying, based on receiving a second unlock touch gesture corresponding to a second mode, at least one icon of applications associated with the second mode on the display of the electronic device,
wherein the method further comprises:
displaying a first screen including a first icon for mode conversion and the at least one icon of applications associated with the first mode while the electronic device operates in the first mode, and
based on the first icon for mode conversion being selected in the first mode, removing the first screen including the first icon for mode conversion and the at least one icon of applications associated with the first mode and displaying a first lock screen including the plurality of UI elements for receiving the unlock touch gesture,
wherein the method further comprises:
displaying a second screen including a second icon for mode conversion and the at least one icon of applications associated with the second mode while the electronic device operates in the second mode, and
based on the second icon for mode conversion being selected in the second mode, displaying a second lock screen including the plurality of UI elements for receiving the unlock touch gesture on the second screen while the at least one icon of applications associated with the second mode and the second icon for mode conversion are displayed on the second screen.

20. A non-transitory recording medium which stores a program for executing a method for controlling an electronic device operating in one of a plurality of modes, the method comprising:
displaying a lock screen on a display of the electronic device, wherein the lock screen includes a plurality of user interface (UI) elements for receiving an unlock touch gesture;
receiving the unlock touch gesture;
displaying, based on receiving a first unlock touch gesture corresponding to a first mode, at least one icon of applications associated with the first mode on the display of the electronic device; and
displaying, based on receiving a second unlock touch gesture corresponding to a second mode, at least one icon of applications associated with the second mode on the display of the electronic device,
wherein the method further comprises:
displaying a first screen including a first icon for mode conversion and the at least one icon of applications associated with the first mode while the electronic device operates in the first mode, and
based on the first icon for mode conversion being selected in the first mode, removing the first screen including the first icon for mode conversion and the at least one icon of applications associated with the first mode and displaying a first lock screen including the plurality of UI elements for receiving the unlock touch gesture,
wherein the method further comprises:
displaying a second screen including a second icon for mode conversion and the at least one icon of applications associated with the second mode while the electronic device operates in the second mode, and based on the second icon for mode conversion being selected in the second mode, displaying a second lock screen including the plurality of UI elements for receiving the unlock touch gesture on the second screen while the at least one icon of applications associated with the second mode and the second icon for mode conversion are displayed on the second screen.

21. The electronic device of claim 1, wherein the applications associated with the first mode include an application dedicated to the first mode for setting an application to be executable or un-executable in each of the first and the second modes.

22. The electronic device of claim 1, wherein the first icon for mode conversion is an identifier indicating the first mode.

23. The method of claim 19, wherein the first icon for mode conversion is an identifier indicating the first mode.

24. The non-transitory recording medium of claim 20, wherein the first icon for mode conversion is an identifier indicating the first mode.

25. The electronic device of claim 1, wherein the second icon for mode conversion is an identifier indicating the second mode.

26. The method of claim 19, wherein the second icon for mode conversion is an identifier indicating the second mode.

27. The non-transitory recording medium of claim 20, wherein the second icon for mode conversion is an identifier indicating the second mode.

* * * * *